US009760928B1

(12) United States Patent
Ward, Jr. et al.

(10) Patent No.: US 9,760,928 B1
(45) Date of Patent: Sep. 12, 2017

(54) CLOUD RESOURCE MARKETPLACE FOR THIRD-PARTY CAPACITY

(75) Inventors: David John Ward, Jr., Seattle, WA (US); Brian Helfrich, Seattle, WA (US); David Nunnerley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 679 days.

(21) Appl. No.: 13/429,985

(22) Filed: Mar. 26, 2012

(51) Int. Cl.
*G06Q 30/00* (2012.01)
*G06Q 30/06* (2012.01)

(52) U.S. Cl.
CPC ..... *G06Q 30/0619* (2013.01); *G06Q 30/0613* (2013.01); *G06Q 30/0623* (2013.01)

(58) Field of Classification Search
CPC .............. G06Q 30/0619; G06Q 30/00; G06Q 30/0601; G06Q 30/0613; G06Q 30/0623; H04L 63/105; H04L 67/00; G06F 2009/4557
USPC ...................................................... 705/26.44
See application file for complete search history.

(56) References Cited

U.S. PATENT DOCUMENTS

| 5,692,174 | A | 11/1997 | Bireley et al. |
|---|---|---|---|
| 6,421,728 | B1 | 7/2002 | Mohammed et al. |
| 6,493,685 | B1 | 12/2002 | Ensel et al. |
| 7,412,538 | B1 | 8/2008 | Eytchison et al. |
| 7,637,426 | B1 | 12/2009 | Green |
| 7,743,001 | B1 | 6/2010 | Vermeulen et al. |
| 7,768,920 | B2 | 8/2010 | Goshen et al. |
| 7,870,044 | B2 | 1/2011 | Robertson |
| 8,024,225 | B1 | 9/2011 | Sirota et al. |

(Continued)

FOREIGN PATENT DOCUMENTS

WO   WO 2011011709 A2 *  1/2011

OTHER PUBLICATIONS

U.S. Appl. No. 13/535,720, filed Jun. 28, 2012, Matthew D. Klein, et al.

(Continued)

*Primary Examiner* — Michael Misiaszek
*Assistant Examiner* — Christopher Seibert
(74) *Attorney, Agent, or Firm* — Robert C. Kowert; Meyertons, Hood, Kivlin, Kowert & Goetzel, P.C.

(57) ABSTRACT

Methods and apparatus for a cloud resource marketplace for third-party capacity are disclosed. A system includes a plurality of resources of a primary network, and a resource manager. The resource manager implements a reservation interface allowing a client to select and reserve resources of the primary network. In response to a resell request from a third-party resource provider, requesting advertisement of the availability of a third-party resource via the reservation interface, the resource manager may determine whether to resell the third-party resource based on one or more acceptance criteria. In response to determining to resell the third-party resource, the resource manager may indicate, via the reservation interface, a pricing policy associated with the third-party resource, an interruptibility setting of the third-party resource, and a level of compatibility of the third-party resource with a control interface implemented to allow clients to perform operations on resources of the primary network.

27 Claims, 13 Drawing Sheets

(56) References Cited

U.S. PATENT DOCUMENTS

| | | | |
|---|---|---|---|
| 8,271,653 B2* | 9/2012 | DeHaan | H04L 41/0803 709/223 |
| 8,346,857 B2* | 1/2013 | Denker et al. | 709/203 |
| 8,402,139 B2* | 3/2013 | Ferris | G06F 9/50 709/224 |
| 8,595,191 B2 | 11/2013 | Prahlad et al. | |
| 8,615,584 B2 | 12/2013 | Dawson et al. | |
| 8,819,490 B2* | 8/2014 | Li | G06F 11/3688 714/32 |
| 8,826,068 B2* | 9/2014 | Somendra | G06F 11/3688 714/15 |
| 2003/0028642 A1 | 2/2003 | Agarwal et al. | |
| 2003/0088482 A1 | 5/2003 | Blumberg | |
| 2003/0126196 A1 | 7/2003 | Lagimonier et al. | |
| 2003/0229529 A1 | 12/2003 | Mui et al. | |
| 2004/0030740 A1 | 2/2004 | Stelting | |
| 2004/0044563 A1* | 3/2004 | Stein | 705/10 |
| 2004/0243430 A1 | 12/2004 | Horstemeyer | |
| 2006/0159014 A1 | 7/2006 | Breiter et al. | |
| 2007/0219837 A1 | 9/2007 | Lu et al. | |
| 2008/0103848 A1 | 5/2008 | Santos et al. | |
| 2008/0167928 A1 | 7/2008 | Cao et al. | |
| 2008/0243666 A1 | 10/2008 | Rowan | |
| 2009/0049114 A1 | 2/2009 | Faraj | |
| 2009/0164635 A1* | 6/2009 | Denker et al. | 709/226 |
| 2009/0182598 A1 | 7/2009 | An et al. | |
| 2009/0241030 A1* | 9/2009 | Von Eicken et al. | 715/735 |
| 2009/0276771 A1 | 11/2009 | Nickolov et al. | |
| 2009/0281952 A1 | 11/2009 | Toffey et al. | |
| 2009/0300423 A1* | 12/2009 | Ferris | G06F 11/36 714/38.1 |
| 2010/0010657 A1 | 1/2010 | Do et al. | |
| 2010/0050172 A1 | 2/2010 | Ferris | |
| 2010/0070397 A1 | 3/2010 | Hahn-Carlson et al. | |
| 2010/0198960 A1* | 8/2010 | Kirschnick | G06F 11/3414 709/224 |
| 2010/0241479 A1 | 9/2010 | Chaushev | |
| 2011/0145094 A1 | 6/2011 | Dawson et al. | |
| 2011/0145392 A1* | 6/2011 | Dawson et al. | 709/224 |
| 2011/0154353 A1 | 6/2011 | Theroux et al. | |
| 2011/0295986 A1 | 12/2011 | Ferris et al. | |
| 2011/0296025 A1 | 12/2011 | Lieblich et al. | |
| 2012/0016721 A1 | 1/2012 | Weinman | |
| 2012/0131161 A1 | 5/2012 | Ferris et al. | |
| 2012/0159506 A1 | 6/2012 | Barham et al. | |
| 2012/0173725 A1 | 7/2012 | Verma | |
| 2012/0233668 A1* | 9/2012 | Leafe et al. | 726/4 |
| 2012/0311128 A1* | 12/2012 | Pechanec | G06F 11/3414 709/224 |
| 2013/0019242 A1 | 1/2013 | Chen | H04L 41/145 718/1 |
| 2013/0041989 A1* | 2/2013 | Boss et al. | 709/223 |
| 2013/0054792 A1* | 2/2013 | Sharaf | G06F 8/20 709/224 |
| 2013/0111027 A1* | 5/2013 | Milojicic et al. | 709/225 |
| 2013/0167128 A1* | 6/2013 | Narayana Iyer et al. | 717/143 |
| 2013/0173418 A1 | 7/2013 | Goad et al. | |
| 2013/0173962 A1* | 7/2013 | Li | G06F 11/3688 714/32 |
| 2013/0212279 A1 | 8/2013 | Dutta et al. | |
| 2013/0232252 A1 | 9/2013 | Huang et al. | |
| 2013/0238785 A1 | 9/2013 | Hawk et al. | |
| 2013/0246208 A1 | 9/2013 | Jain et al. | |

OTHER PUBLICATIONS

U.S. Appl. No. 13/535,715, filed Jun. 28, 2012, Matthew D. Klein, et al.

U.S. Appl. No. 13/535,707, filed Jun. 28, 2012, Matthew D. Klein, et al.

U.S. Appl. No. 13/535,725, filed Jun. 28, 2012, Matthew D. Klein, et al.

AWS Documentation, "Using Cluster Instances," downloaded from docs.amazonwebservices.com/AWSEC2/latest/UserGuide/using_cluster_computing.html on May 16, 2012, pp. 1-6.

Amazon Web Services: AWS Products & Solutions, "High Performance Computing (HPC) on AWS," downloaded from aws.amazon.com/hpc-applications/ on May 16, 2012, pp. 1-3.

Timo Schneider (personal website), "An Oblivious Routing Congestion Simulator," downloaded from perlplexity.org/Research/ORCS/ on May 16, 2012, pp. 1-8.

U.S. Appl. No. 13/431,379, filed Mar. 27, 2012, David John Ward, Jr.

U.S. Appl. No. 13/431,388, filed Mar. 27, 2012, David John Ward, Jr., et al.

U.S. Appl. No. 13/429,957, filed Mar. 26, 2012, David John Ward, Jr., et al.

U.S. Appl. No. 13/431,355, filed Mar. 27, 2012, David John Ward, Jr.

U.S. Appl. No. 13/431,348, filed Mar. 27, 2012, David John Ward, Jr., et al.

U.S. Appl. No. 13/431,360, filed Mar. 27, 2012, David John Ward, Jr.

U.S. Appl. No. 13/430,003, filed Mar. 26, 2012, David John Ward, Jr., et al.

U.S. Appl. No. 13/431,393, filed Mar. 27, 2012, David John Ward, Jr.

U.S. Appl. No. 13/475,399, filed May 18, 2012, David John Ward, Jr.

U.S. Appl. No. 13/475,359, filed May 18, 2012, David John Ward, Jr.

U.S. Appl. No. 13/461,605, filed May 1, 2012, David John Ward, Jr., et al.

U.S. Appl. No. 13/476,828, filed May 21, 2012, David John Ward, Jr., et al.

U.S. Appl. No. 13/475,461, filed May 18, 2012, David John Ward, Jr., et al.

U.S. Appl. No. 13/331,750, filed Dec. 20, 2011, Amazon Technologies, Inc., all pages.

Amazon Web Services, "Discussion Forums; Existing Connections Dropped Rudely when Instance Taken out of ELB", Eric Hammond, Feb. 25, 2011, pp. 1-4.

Amazon Web Services, "Amazon Elastic Compute Cloud (Amazon EC2)", Mar. 24, 2011, pp. 1-26.

Amazon Web Services, "Amazon EC2 Pricing", Feb. 28, 2011, pp. 1-13.

Amazon Web Services, "Amazon EC2 Spot Instances", Feb. 24, 2011, pp. 1-5.

Amazon Web Services, "Amazon CloudWatch", Feb. 24, 2011, pp. 1-5.

Agarwal, Sharad, et al. "Volley: Automated Data Placement for Geo-Distributed Cloud Services." 2010, pp. 1-16.

* cited by examiner

Resell Center Home Page https://<website>.com/resellHome

Dear John Doe, Welcome to the resell center! ← 703

Begin by telling us about yourself, and describing the resource you would like us to resell.

Provider information
- Provider Name: [ ]
- Contact Information: [ ]
← 705

Data center location(s)
- Data center #1: [ ]
- Data center #2: [ ]
- Click to enter additional info...
← 707

For each set of resources to be resold, please enter the following specifications

Resource Set 1 ← 709

- Resource Type (e.g., compute/storage/bandwidth): [ ]
- Number of resources: [ ]
- Hardware vendor(s)/model(s): [ ]
- Software/firmware specifications (e.g., hypervisor, OS): [ ]
- Performance specifications: [ ]
- Access coordinates (e.g., IP addresses): [ ]
- Click to enter info for more resource sets...

[ Next ] ← 715

Resell Center Home Page https://<website>.com/resellHome2

Part 2 of Resell Request Form...

Control Interface Details

Click to learn more

○ Fully support ZZZ interface spec
○ Partly support ZZZ interface spec
○ Support other spec
○ Bare-metal only

← 805

How would you like to price this resource set?

Click to learn more

◉ Dynamic spot-pricing
○ Auction
○ Short-term fixed price
○ Long-term fixed-price

← 810

Desired Interruptibility Settings

Click to learn more

◉ Don't care
○ Price-based
○ Fulfillment-based interruptions
○ No interruptions

← 815

Would you like to use our optimization engine to schedule your resources?

Click to learn more

◉ No, don't bother
○ Yes, maximize revenue
○ Yes, maximize long-term utilization

← 820

Next  ← 825

*Figure 8*

Reservations Home Page https://<website>.com/reservations

Dear John Doe, Welcome to the resource reservation center!

Reserve resources from the world's best resource providers . ← 1003

To help us choose the resources that best fit your needs, enter your choices for as many of the following criteria and then press "Show me my choices."

1007

| Field | Value |
|---|---|
| Resource type (e.g., compute/storage/bandwidth)* | Compute (default) |
| Resource size (e.g., small/large)* | Small (default) |
| Maximum price/hour you are willing to pay* | USD 0.05 (default) |
| Click to see pricing history | |
| Preferred vendor(s) | |
| Preferred pricing model | |
| Preferred interruptibility mode | |
| Preferred interface compatibility level | |
| Time period for which you would like to retain resource(s) | |
| Preferred data center location | |
| Preferred vendor satisfaction rating | |

* Required fields

Show me my choices! ← 1015

Reservations Choices Page https://<website>.com/foundchoices

Here are some resources we found, ranked by price.
Feel free to change the ranking criteria. ←—1103
If you wish to make a reservation, click on the
"Reserve" button for your selection

| Ranking criterion #1 | Price (default) |
| Ranking criterion #2 | Vendor rating (default) |

1107A

Vendor: AAAAA Systems, Inc.

Current price (valid until KK:LL EST, MM/NN/PPPP)

Reservations made in last 6 months

Satisfaction rating over last 6 months

Number of resources matching your needs (as of 10:56 AM EST)

Interface Compatibility Levels supported

Interruptibility modes supported

Pricing models supported

| I need more info... | Reserve ... |

1107B

Vendor: BBBB Systems, Inc.

Current price (valid until KK:LL EST, MM/NN/PPPP)

Reservations made in last 6 months

Satisfaction rating over last 6 months

Number of resources matching your needs (as of 10:56 AM EST)

Interface Compatibility Levels supported

Interruptibility modes supported

Pricing models supported

| I need more info... | Reserve ... |

MORE CHOICES... ←—1115

*Figure 11*

CLOUD RESOURCE MARKETPLACE FOR THIRD-PARTY CAPACITY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The operators of the provider networks may have to incur substantial expenses to buy the hardware for their data centers. During any given time period, however, some fraction of the resources are often not in use by the clients of the provider network, thereby potentially impacting the revenue obtained by the provider network operator for its infrastructure investment. The provider network operator may have to try to ensure that a number of potentially competing demands are met, e.g., that all guaranteed commitments to clients (e.g., long-term reservations that have already been paid for) are honored, that the dynamically-varying portion of resource pricing does not get so high that customer satisfaction suffers, that the data center investment is justified by a reasonable level of resource utilization and revenue, and so on. The problem of client satisfaction may be exacerbated during periods of high demand, when for example the dynamic prices of resources may shoot up, thereby interfering with the clients' ability to perform the types of operations (e.g., large-scale computations, or high-throughput transaction systems) for which they may have come to rely on provider cloud networks.

BRIEF DESCRIPTION OF THE DRAWINGS

FIGS. 7 and 8 illustrate portions of an example web-based interface that may be used by a third-party resource provider for requests to resell resources, according to some embodiments.

FIG. 10 illustrates a portion of an example web-based interface that may be used to submit a resource reservation request, according to some embodiments.

FIG. 11 illustrates a portion of an example web-based interface that may be used to respond to a resource reservation request, according to some embodiments.

Figure 1:
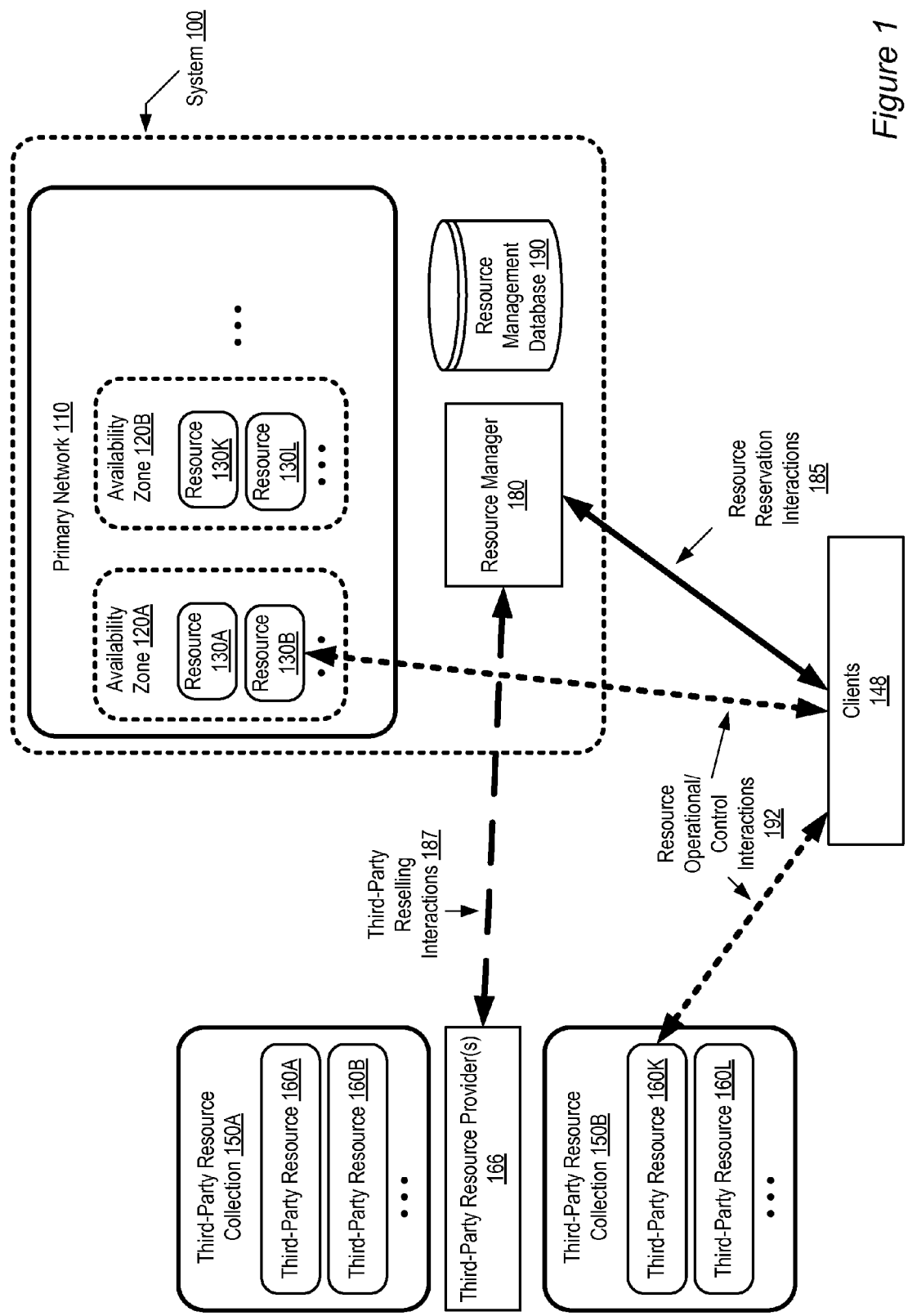
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for a cloud resource marketplace for third-party capacity are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered to clients in units called "instances," such as virtual or physical compute instances or storage instances. A virtual compute instance may, for example, comprise a server with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, a resource manager of the provider network may implement a programmatic resource reservation interface (e.g., via a web site or a set of web pages, a command-line interface, or an application programming interface (API)) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for actual usage of the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic price determined at least in part by supply and demand, that type of resource would be provided to the client. During periods when the supply of the requested resource type exceeded the demand, the dynamic price (which may be termed the "spot" price herein) may become significantly lower than the price for on-demand mode. In some implementations, if the spot price increases beyond the maximum specified by a client, e.g., due to an increase in demand, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

In order to meet the resource needs of various types of clients, some of whom may prefer one reservation mode over another, and also to try to optimize overall resource utilization and/or return on investment of the provider network operator, the resource manager may organize provider network resources into pools. In one simple example, one set of resources may be placed in a long-term-reservations pool, another in an on-demand pool, and a third set in a spot pool. Resources may be moved from one pool to another as needed in some implementation in response to supply, demand, and observed levels of actual usage of the resources. For example, in one embodiment the actual utilization of a set of instances in a long-term reservations pool may show (often at least partly predictable) peaks and valleys—e.g., the resources may be busy during weekdays, but mostly unused during weekends. In such cases, and especially if spot-based allocations are interruptible, the resource manager may try to sell some of the underused resource capacity on the spot market (i.e., the underused instances may be temporarily added to the pool of instances used for the spot-based-price mode). If a client that has made a long-term reservation for a resource instance of a particular type needs to use the instance, and the resource manager determines (e.g., based on the current supply and demand conditions) that the best way to provide the requested instance is to interrupt a spot-price-based allocation, a spot-price based allocation for a resource of that type may be revoked. Such an interruption or revocation may in some circumstances be accompanied by an increase in the spot price. The resource manager may typically maintain buffers of unused resource instances for one or more of the three pools, so that allocation interruptions/revocations are minimized, and so that the number of requests for on-demand resources that have to be rejected due to insufficient available resources is minimized as much as possible.

Despite the best efforts of the resource manager, however, there may be periods of time during which it becomes very difficult to meet all the incoming resource requests at acceptable prices. If such periods become too frequent, client satisfaction rates may begin to drop. In some embodiments, a resource manager of a provider network may be configured to expand the set of resources for which it provides reservations and access beyond the set of resources of the provider network itself, thereby expanding the set of sources from which client resource demands may be satisfied. In such an embodiment, the resource manager may, for example, implement a third-party reselling interface, allowing entities other than the provider network operator to request that third-party resources be made available for reservation and/or purchase via the resource manager's reservation interface, or via an extension of the resource manager's reservation interface. Entities other than the provider network operator may be termed "third-party providers" herein. Examples of third-party provider may include other infrastructure providers whose primary business is to provide network-accessible services conceptually similar to those of the provider network, corporations whose Information Technology (IT) departments have noticed that their data centers often contain a lot of underused resources, and so on. In embodiments where such third-party requests are supported, the provider network itself may be termed the "primary" network from the perspective of the resource manager. The resource manager may, in such an embodiment, be responsible for a number of different functions needed to support access to the third-party resources, which are described below in further detail. Such functions may in various embodiments include, for example, implementing the third-party reselling interface, enhancing/extending a reservations interface, enhancing/extending an operations or control interface (which may be used by a client to stop/start/terminate/describe resource instances), translating client requests into an idiom supported by a third-party provider, monitoring resources of a third-party provider, implementing at least a part of the billing-related functions for third-party resources, and collecting and providing reputation-related information on third-party providers (e.g., satisfaction ratings, rankings, comments and the like). By expanding the number of sources of resource capacity by including third-party resource pools in this way, the resource manager may be able to further increase its ability to meet variable client demand, while keeping costs down, thereby maintaining high levels of customer satisfaction. At the same time, third-party providers may be able to better utilize their own resources and data centers, in addition to enhancing their own revenues. Several different types of third-party resources may be resold in various embodiments, including compute resources, storage resources, as well as bandwidth. In the case of bandwidth, for example, clients may be able to upload/download potentially large data sets using network paths and links that may be owned/managed at least in part by the third-party providers, thereby relieving some of the network load from the primary network.

According to one embodiment, a resource manager may receive, from a third-party resource provider, a resell request to advertise an availability of a third-party resource via the resource manager's reservation interface. That is, the third-party resource provider may wish to make use of the existing reservation interface of the primary network to resell third-party resources, thereby potentially gaining the benefits of the name or brand recognition of the primary network. The third-party resource may include for example one or physical or virtual compute servers, one or more physical or virtual storage servers, portions of compute server capacity (e.g., computational capacity expressed in CPU-hours or CPU-minutes), storage server capacity, or bandwidth capacity. In response to the resell request, the resource manager may determine whether to resell the third-party resource via the reservation interface based on one or more acceptance criteria—for example, criteria based on a performance specification of the third-party resource. If the resource manager determines that the third-party resource should in fact be resold via the reservation interface, information about the third-party resource may be made accessible via the reservation interface. Such information may include, for example, pricing policies for the third-party resource (e.g., whether dynamic spot pricing is to be used, an auction model is to be used, and so on), and/or interruptibility settings for the third-party resource (e.g., whether a reservation or allocation can be revoked based on a change in a dynamic price or in response to some other event). Pricing policies and interruptibility settings may be interdependent in some embodiments—e.g., only a subset of the interruptibility settings may be supported for a given pricing mode. In some environments the third-party resource provider may wish to ensure that allocations of its resources be interruptible so that, if the third-party resource provider experiences a spike in demand from its own customers, the resources can be reclaimed quickly to meet the spike.

As noted earlier, the resource manager may implement a control or operations interface to allow clients to perform various types of management operations on their instances within the provider network (the resource manager's primary network) in some embodiments—e.g., to inspect the status of a resource instance, view or modify properties of their resource instances, start and stop instances, and the like. A client that wishes to make use of third-party resources may wish to know the extent to which the third-party resource provider supports, or is compatible with, the control interface provided by the resource manager for the provider network. In one embodiment, the resource manager may indicate, via the reservation interface, a level of compatibility of the third-party provider's resources with the resource manager's control interface. If the third-party fully or largely supports the control interface, for example, the third-party resources may be designated as "tightly-compatible" with the resources of the primary network, thereby allowing clients of the primary network to re-use their resource management tools (e.g., resource startup/shutdown scripts) for the third-party resources without significant additional effort. In some cases, a third-party provider may support only a small subset (or none) of the resource provider's control interface, in which case the reservation interface may be used to indicate that the third-party resources are "loosely-compatible" or "incompatible" with the control interface. In such cases, a client may need to perform some extra work to port their existing tool set, or create a new tool set, to perform the desired operations on the third-party resources. Alternatively, in some embodiments, the resource manager may provide translation functionality, such that the client may continue to submit operational commands and requests using the provider network's control interface, and the command may be translated as needed to a format understood by the third-party resource. The resource manager may provide an installable agent or tool to clients that wish to deploy the translation service in some embodiments. Using the compatibility level information provided, prospective clients may be able to make informed decisions about the amount of effort that may be required to utilize third party resources.

If a client decides to reserve, or purchase access to, a third-party resource using the resource manager's reservation interface, the resource manager may perform the necessary operations to complete the requested reservation or purchase (e.g., notifying the third-party provider) in some embodiments. The client may then be provided with the necessary information to begin using the third-party resource (e.g., the Internet Protocol (IP) address of the third-party resource, the API calls or commands to use to access and control the resource either directly or via an intermediary such as a translation module provided by the resource manager, and so on.) For reselling third-party bandwidth, any appropriate communication protocol supported by the third-party provider may be used in different embodiments, such as variants of the File Transfer Protocol (FTP) and the like, and the client may be informed of the protocol and/or the target source or destination networking addresses to use for data transfers. Depending on the specifics of the third-party reservation or purchase, such as the pricing model, the selected interruptibility setting, the compatibility level, and so on, the resource manager may continue to interact with the client as needed during the resource reservation and usage lifecycle. The resource manager may in some embodiments also implement various billing-related services or operations on behalf of the third-party provider. For example, to simplify billing from the client point of view, a common invoice may be provided to a client (instead of for example separate bills for the primary network resources and the third-party resources) in one embodiment. The resource manager may also in some implementations receive various types of payments (including upfront payments, pre-payments and/or usage based payments) from a client and disburse the appropriate amounts to the various third-party providers whose resources were used by the client.

Example System Environment

FIG. 1 illustrates an example system environment, according to at least some embodiments. The system 100 may include a primary network 110 comprising a plurality of resources 130, such as resources 130A, 130B, 130K, and 130L, as well as third-party resource collections 150A and 150B. Each third-party resource collection 150 may be owned, operated and/or managed by a third-party resource provider 166 different than the operator of the primary network 110, and each third-party resource collection 150 may comprise one or more third-party resources 160, such as third-party resources 160A and 160B of collection 150A, and third-party resources 160K and 160L of collection 150B. The system 100 may include a resource manager 180, operable to implement a number of resource reservation, selling, and reselling functions. The resource manager 180 may in some embodiments store data associated with resource reservations, purchases, pricing, monitoring, and the like in a resource management database 190.

Clients 148 may communicate with the resource manager 180, e.g., via reservation interactions 185 that may include requests to browse available resources, find resources of desired types, make short-term or long-term reservations or purchases, bid on resources, view resource status, and the like. Third-party resource providers 166 may communicate with the resource manager 180, e.g., via third-party reselling interactions 187, such as resell requests, reservation/purchase notifications, reservation revocation notifications, and so on. In some embodiments a control interface may be implemented, e.g., by the resource manager 180, supporting resource operational/control interactions 192 that clients may perform on resources 130 of the primary network 110 and/or third-party resources 160. Depending, for example, on the level of compatibility between resource control interfaces supported by the various third-party resource providers 166 and the control interface supported for the primary network 110, the resource manager 180 may be involved to some extent in supporting resource control interactions for third-party resources 160 in some implementations. For example, instead of sending an "instance start" request to a third-party instance 160 directly, in some embodiments client may send the "instance start" request to a component of the resource manager 180; the component may then translate the request into a format or language understood by the third-party resource 160, and forward the translated request on to the third-party resource 160. The translation component may be provided to the clients 148 for local installation in client networks or on client premises in some implementations.

In some embodiments, the resources of the primary network 110 may be organized into groups or a hierarchy of groups. For example, in the illustrated embodiment, resources 130A and 130B are shown within an availability zone 120A, and resources 130K and 130 are shown within availability zone 120B. An availability zone 120 may represent a data center or other geographic location of the underlying computing hardware used to provide the resources. The set of resources 130 within a given availability zone may in general have availability characteristics that are independent of the availability characteristics of resources in other availability zones—e.g., the probability that a resource outage within availability zone 120A correlates with, or overlaps in time with, a resource outage within availability zone 120B, may be very low. Similarly, in some embodiments, the correlation between outages at a given third-party resource collection 150, and outages at any availability zone 120 or outages at a different third-party resource collection may also be very low, thereby allowing the resource manager to consider a third-party resource collection 150 to be analogous to an availability zone in some respects. In some embodiments third-party resource providers 166 may implement their own availability zones 120 (or their own equivalents of availability zones), and may indicate the availability-related characteristics of their resources via resell requests to resource manager 180, or in other interactions with resource manager 180. In one embodiment, primary network 110 may be divided into geographical regions, where each region may in turn comprise one or more availability zones 120; similarly, third-party resource collections 150 may also be organized in geographical regions in some environments, and details about the region to which a given third-party resource 160 belongs may also be communicated by third-party resource provider 166 to resource manager 180.

A third-party resource provider 166 that wishes to enable reservations or purchases of its resources 160 via the resource manager 180 may transmit a resell request to the resource manager in one embodiment. The resell request may comprise, for example, various specifications and details of the third-party resource 160, as described below in conjunction with the discussion of FIG. 2. The resell request may be formatted in accordance with a programmatic third-party reselling interface, such as a web interface, a command-line interface, or an API, implemented by or and/supported by resource manager 180. Upon receiving the resell request, the resource manager 180 may use one or more acceptance criteria to determine whether to accept the request. For example, in one embodiment, the resource manager 180 may first perform a preliminary set of checks on the third-party resource 160, such as checking whether the specified hardware and software of the resource is included within a supported platform set, whether the third-party provider is one that has signed a required business agreement with the operator of primary network 110, and so on. The resource manager 180 may, in some embodiments, initiate one or more tests on the third-party resource 160 (e.g., using an IP address for the resource 160 included in the resell request to access the resource to initiate the tests), and determine whether the resource should be resold based at least partly on the results of the tests. A variety of tests may be used in different embodiments, including for example CPU performance tests, memory size determination for various levels of the memory hierarchy, storage capacity determination, software version checks, verification of installed software packages, license checks, and so on.

After the resource manager 180 decides that the resell request should be accepted, in some embodiments information about the third-party resource 160 may be made accessible via an interface supported by the resource manager 180, such as the reservations interface already usable by clients 148 of the primary network 110, or an extension of such an interface. The information made available about the third-party resource 160 may include basic specifications such as performance capabilities, availability characteristics, the name of the third-party provider, and so on. Information about supported pricing models or alternatives may also be exposed by the resource manager 180 in one embodiment, e.g., whether access to the third-party resource 160 can be paid for using dynamic spot-pricing (where the client specifies a maximum acceptable price, and the client's bid is accepted or rejected based on a dynamically varying spot price determined by supply and demand), an auction (such as an ascending price auction, a Dutch auction, a sealed-bid first-price auction, or a sealed-bid second price auction), an immediate-pricing mode (in which a price that may remain valid for only a short duration for a purchase or reservation is quoted), or a fixed-price-for-term scheme in which a fixed price is quoted for a specified term. The terms for the fixed price models may vary; e.g., in an on-demand pricing model, fixed prices may be applicable for a few hours at a time, while in a long-term reservations pricing model, the fixed prices may be applicable for much longer time periods (e.g., for one-year or three-year terms). Other pricing modes and models may be disclosed to clients 148 in other embodiments.

In some embodiments, information about interruptibility settings for the third-party resource 160 may be provided via the reservations interface of the resource manager 180. For example, the interface may indicate a do-not-interrupt setting, whereby once the third-party resource 160 is reserved, the reservation cannot be revoked until the reservation term expires. The interface may indicate a price-based-interrupts policy, whereby the client is informed that if another client willing to pay more for the third-party resource 160 is found, an existing or ongoing reservation or allocation period of the third-party may be interrupted (i.e., access to the resource may be terminated). If a fulfillment-based interruptibility setting is indicated via the interface, a resource reservation and/or ongoing access to the resource may be discontinued if the third-party provider received a request to fulfill a pre-existing reservation from some other client. Other interruptibility settings or modes may be disclosed to clients 148 in other embodiments. In some embodiments interruptibility settings may be linked to pricing—e.g., if a fixed-price-for-term pricing policy is used, in some implementations reservations may not be interruptible. Clients 148 may be allowed to choose from among a set of options for interruptibility and/or pricing in some embodiments, while in other embodiments clients may simply be informed of the supported interruptibility setting and pricing mode.

An indication of the extent to which the third-party resource supports, or is compatible with, a control interface usable to perform various operations on the resources 130 of primary network 110, including such operations as "start instance", "stop instance", "terminate instance", "describe instance", or "show instance status", may also be provided to clients 148 by resource manager 180 in some embodiments. In one implementation, a "highly-compatible" rating may indicate that the third-party resource 160 supports much or all of the primary network 110's control interface; a "somewhat-compatible" rating may indicate that a subset of the primary control interface is supported while at least one operation supported in the primary control interface is not supported by the third-party resource; while an "incompatible" rating may indicate that the third-party resource does not support the control interface of the primary network. Definitions of the various compatibility levels, indicating for example which specific API calls or operations are not supported, and which are supported, for a given compatibility level may also be provided via the reservation interface. Other information about the third-party resource 160, and/or the associated third-party resource provider 166, including for example the customer satisfaction ratings of the third-party resource provider or the geographical location of the third-party resource, may also be provided to clients 148 by resource manager 180 in some embodiments.

If a client 148 decides to purchase access to, or make a bid for, a third-party resource 160 via the reservation interface supported by the resource manager 180, the client may specify the desired third-party resource and the selected reservation details (e.g., maximum acceptable price, desired interruptibility setting, and so on). The resource manager may then provide access to the third-party resource 160 to the client 148, e.g., by providing details on how to access the resource (e.g., using the resource's IP address), the commands or interfaces usable to control the third-party resource, and so on. Depending on the nature of the third-party resource being resold (e.g., compute vs. storage vs. bandwidth), different command sets or interfaces may be specified. The resource manager 180 may inform the third-party resource provider 166 about the client's reservation or bid for the third-party resource 160 in some implementations.

Example Constituent Elements of Third-Party Resell Requests

Figure 2:
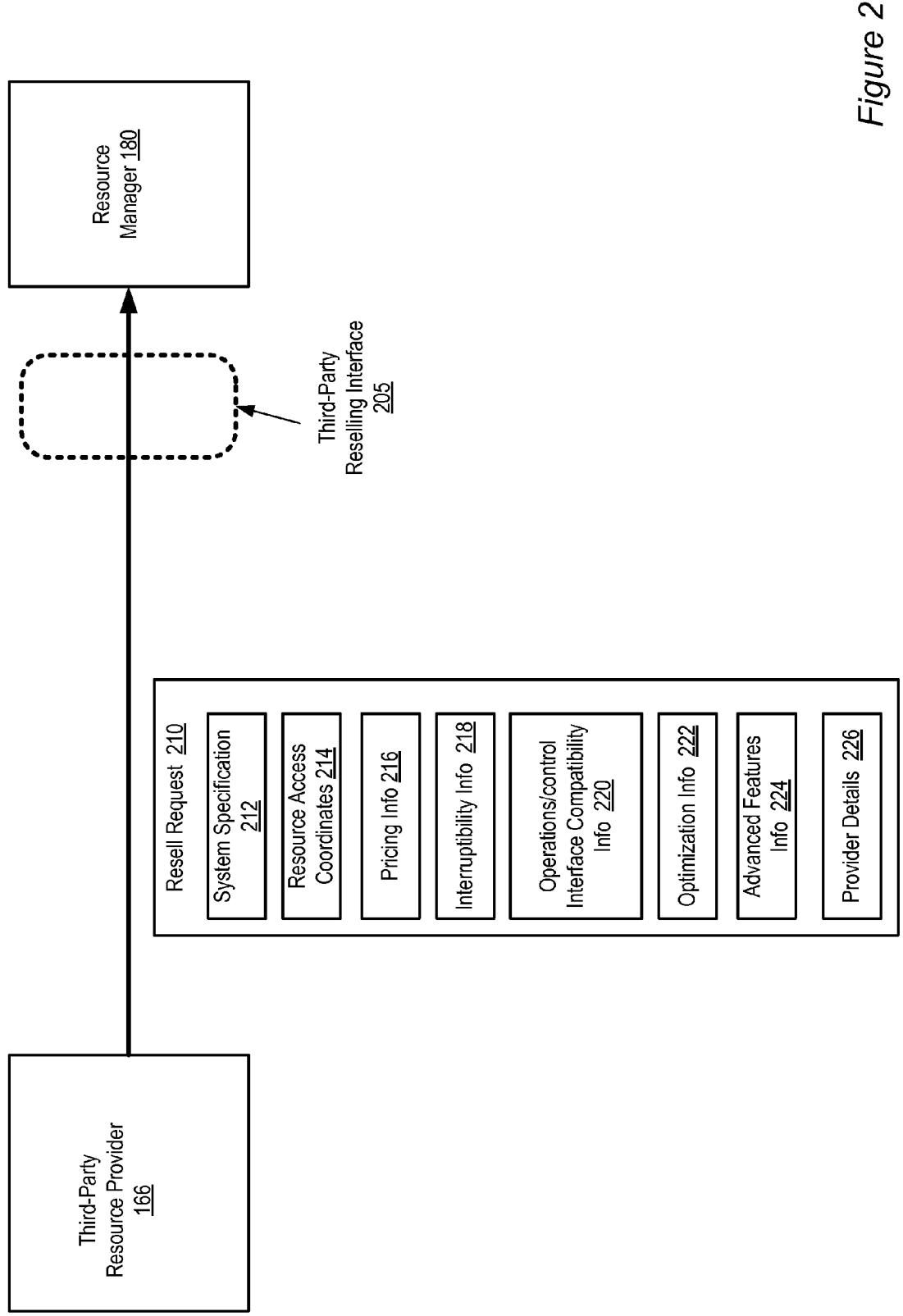
FIG. 2 illustrates examples of the constituent elements of a resell request that may be sent by a third-party resource provider to a resource manager via a third-party reselling interface, according to at least some embodiments.

FIG. 2 illustrates examples of the constituent elements of a resell request 210 that may be sent by a third-party resource provider 166 to a resource manager 180 via a third-party reselling interface 205, according to at least some embodiments. Only a subset of the elements or fields shown in FIG. 2 may be implemented in some implementations, and not all the implemented fields may have to be populated (i.e., some of the fields may be left blank or null) at any given time. As shown, the resell request 210 may comprise a system specification 212 for the third-party resource to be resold. The system specification may include, for example, such details as an identification of a CPU or core type (e.g., a CPU/core vendor name, a chipset identifier, a clock rate), the number of CPUs/cores and how they are connected (e.g., as a shared-memory multiprocessor or a shared-nothing cluster), details of the memory hierarchy (size and speed of main memory and various levels of memory caches such as L1 and L2 caches), bus and interconnect bandwidths and clock rates, network interface card (NIC) specifications, I/O device capacities and transfer rates for short and long I/O operations, video card details, and the like. System specification 212 may also include details of the software stack installed on the third party resource 160, such as operating system name and version, update and patch levels, hypervisor details, installed application stacks and package names (e.g., web server and/or database installation details). System specifications 212 may include claimed performance capabilities (e.g., expressed via industry-standard benchmark results) and/or availability characteristics (e.g., claimed mean-time-between-failure metrics) in some environments. In some embodiments the resell request may include access coordinates 214 for the resource, indicating for example an IP address of the resource and details on how to obtain the authentication credentials that may be needed to access the resource via the IP address.

According to one embodiment the resell request 210 may include pricing information 216, indicating for example the pricing modes (such as any of various types of auctioning approaches, dynamic spot-pricing, on-demand short-term fixed pricing, long-term reservations-based fixed pricing, or immediate pricing) that the third-party resource provider 166 would like to use, or is willing to use, for the third-party resource 166 being resold. Hybrid approaches to pricing may be supported in some embodiments, such as a combination of an auction and immediate pricing mode, in which bids increase over time, but if a client is willing to pay an immediate price that is higher than the current high bid, the auction may be terminated in favor of the client willing to pay the immediate price. In some embodiments the third-party resource provider 166 may allow the resource manager 180 to decide which specific pricing approach or approaches should be used, for example in accordance with a goal or target that may have been pre-arranged with the resource manager, such as a revenue maximization goal (see also the discussion of optimization information 222 below). In other embodiments the pricing information 216 may instruct the resource manager to use only a specified pricing methodology.

In some embodiments interruptibility information 218 may be included in the resell request 210, indicating whether a reservation or allocation period can be interrupted, and if so, under what circumstances interruptions are permitted. Possible choices for interruptibility settings may include, for example, price-based-interrupts, in which a higher bid may lead to a reservation being revoked; fulfillment interrupts, in which the third-party resource provider may be entitled to revoke access to fulfill an outstanding resource commitment to its own customers, and do-not-interrupt, in which reservations cannot be interrupted once made. In some embodiments interruptibility settings may be applicable to active resource instances (i.e., resource instances that have been brought up and are currently serving requests) as well as to resources or instances that have been reserved but are not currently active. In other embodiments reservations may be revoked for a resource only if the resource is currently inactive. Pricing modes and interruptibility settings may be combined in some embodiments, i.e., some interruptibility settings may be applicable only in combination with a specific set of pricing modes. In one embodiment the third-party resource provider 166 may allow the resource manager 180 to choose the interruptibility options to be made available to prospective clients interested in the third-party resource 160.

As noted earlier, in some embodiments various operations on the resources 130 of the primary network 110 may be performed or initiated by clients 148 via an operations or control interface (implemented for example by the resource manager 180). The set of supported operations may include, for example, compute instance control operations such as DescribeInstanceAttribute, DescribeInstances, DescribeInstanceStatus, ImportInstance, ModifyInstanceAttribute, RebootInstances, ReportInstanceStatus, ResetInstanceAttribute, RunInstances, StartInstances, StopInstances, and TerminateInstances. For storage resources, the operations supported may include such actions as CreateVolume, DeleteVolume, DescribeVolumes, ImportVolumes, ExportVolumes, CreateSnapshot, and the like. Various other types of operations, including configuration operations for network interfaces, gateways, IP addresses, security settings, and the like may also be supported via the control interface.

In some embodiments additional sets of commands may be available specifically for different resource acquisition types, such as respective sets of commands for resources with long-term reservations, on-demand resources, and resources that make up a spot-pricing pool. The resell request 210 may include operations/control interface compatibility information 220 indicating the extent to which the third-party resource provider 166 supports the primary network's control interface. For example, in some implementations the primary network's control interface may be publicized as a standard specification with a set of associated tests that may be run to determine compatibility with the interface (similar in concept to the Java™ compatibility kits used for verifying Java™ virtual machine compatibility to specifications), and the resell request may indicate how many of the compatibility tests were successful for the third-party resource 160. In some embodiments the compatibility information 220 may be specified without using specific test results; for example, the third-party resource provider 166 may indicate that it supports a specified subset or all of the operations supported by the primary network. Based on the compatibility information 220, and in some cases on additional tests that may be initiated by the resource manager 180, the resource manager may be able to categorize the third-party resource 160 or the third-party resource provider 166 as being fully compatible, highly-compatible, somewhat-compatible, or incompatible with the primary network's control interface in some embodiments. The third-party resource provider 166 may in one embodiment provide information to the resource manager 180 regarding a monitoring interface usable by the resource manager to monitor various third-party resources, e.g., to monitor performance metrics (such as CPU utilization, memory use, network use), uptime, availability metrics, and so on. Such a monitoring interface may be used by the resource manager at various times for various purposes—e.g., to gather information usable to approve the resell request, to gather statistics after the third-party resources have been resold, to determine quality-of-service metrics and/or satisfaction ratings for the third-party resource provider, and so on.

In one embodiment, the resell request 120 may include optimization information 222 to provide guidance to resource manager 180 on some high-level goals that the third-party resource provider wishes to achieve by reselling its third-party resources 160. For example, the third-party resource may in some embodiments wish to maximize utilization of the third-party resources 160 over the long term, even if increasing the average long-term utilization may harm an impact on short-term revenues (because, for example, long-term reservations may cost less per hour than short-term or on-demand allocation). In such a case the third-party resource provider may inform the resource manager 180 via the optimization information 222 that long-term utilization is to be emphasized as the goal, and the resource manager may as a result try to make decisions in accordance with the expressed optimization goal. For example, to maximize longer term utilization, the resource manager 180 may try to allocate a third-party resource for long term reservations, possibly at a lower price than may be acceptable for shorter-term reservations. In another example, the third-party resource provider may wish to maximize revenue as much as possible in the short term, and may indicate this via the optimization information 222. In response, the resource manager 180 may use pricing and/or interruptibility options that it deems most likely to accrue greater short-term revenue. A third optimization option may indicate to the resource provider that the third-party resource provider may need its resources back at very short notice; in this case, the resource manager 180 may include the third-party resources in a low-priced but immediately interruptible resource pool. In some implementations details of pricing, interruptibility options, and the like may be left to the resource manager, and only the high-level goals of the third-party provider, such as revenue maximization or utilization maximization may be specified to the resource manager.

In some cases the third-party resource provider 166 may support advanced hardware or software features that are not commonly available, especially in cloud platforms. For example, a highly sophisticated interconnect may be supported allowing advanced high-performance computing jobs to be completed much more rapidly than may be feasible with commodity hardware, or an advanced software application may be pre-installed on the third-party resource 160. In some embodiments, the resell request 210 may include advanced features information 224 specifying any unusual or special features that the third-party resource provider wishes to publicize. Provider details field 226 may comprise information about the third-party provider 166, including the name and address of the provider, physical location of the third-party resource 160 being resold, links to the provider's website, reputational details such as accolades/awards won by the provider, and so on. Additional information not shown in FIG. 2 may be included in resell requests in some embodiments. The third-party reselling interface 205 used for the resell request may, for example, comprise one or more web pages or web forms, calls made from an installable standalone application provided by the resource manager 180, one or more API calls, command-line interface (CLI) calls, or any combination of similar interface options. It is noted that for bandwidth and storage resell requests, information not shown in FIG. 3 may be included in some embodiments, such as the maximum network transfer rates supported for client-to-third-party network data transfers and for third-party-to-client network data transfers, the availability features of storage devices (such as the amount of non-volatile cache), and so on.

Acceptance Criteria for Resell Requests

Figure 3:
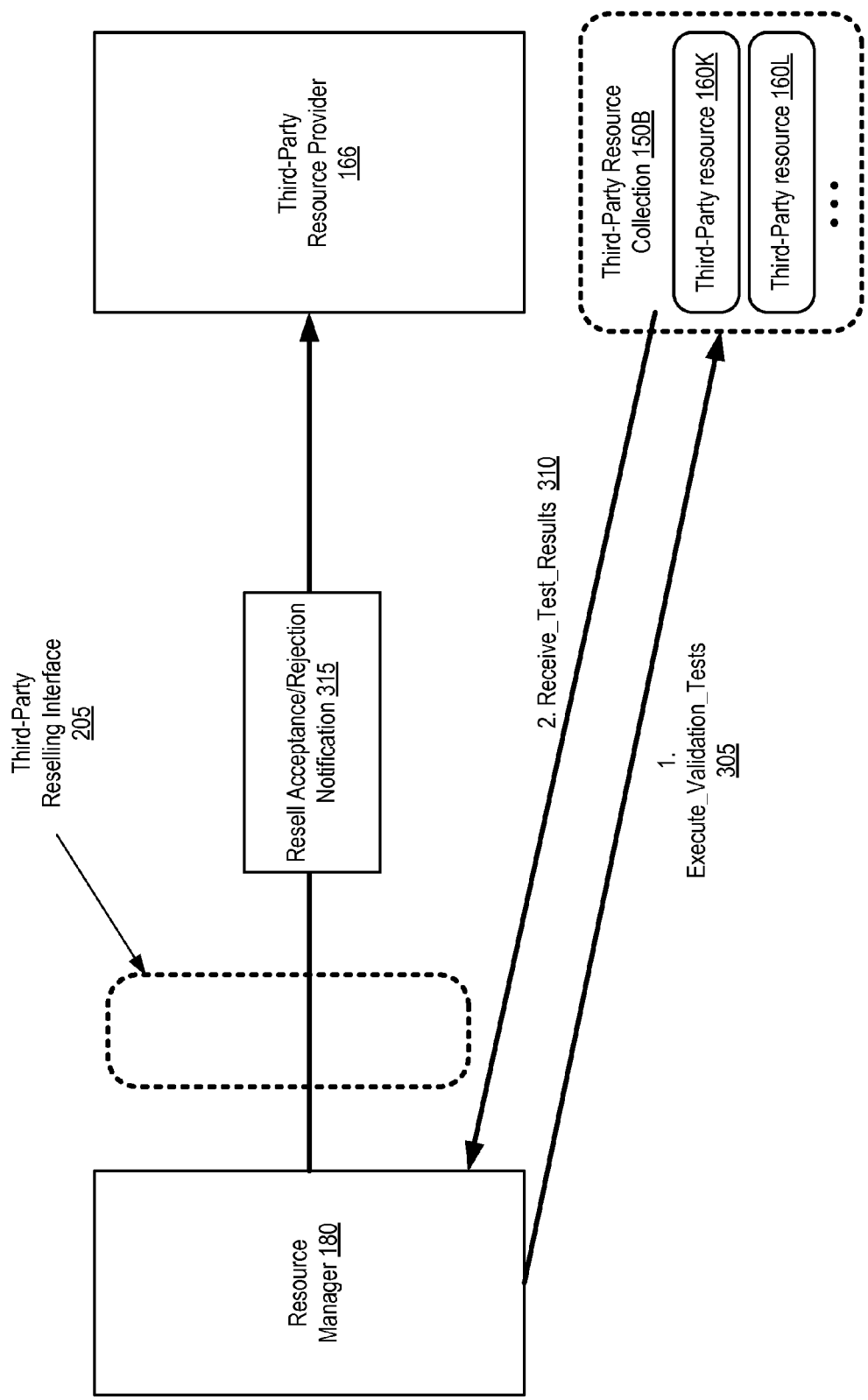
FIG. 3 illustrates operations that may be performed by a resource manager to determine whether to resell a third-party resource, according to some embodiments.

FIG. 3 illustrates operations that may be performed by a resource manager 180 to determine whether to resell a third-party resource 160, according to some embodiments. When a resource manager 180 receives a resell request from a third-party provider 166, the resource manager may take a number of steps to verify that the request is acceptable. In some embodiments, the resource manager 180 may first look up information about the third-party resource provider 166, e.g., in resource management database 190. The resource manager 180 may thereby determine whether a business agreement or contract for reselling resources is currently in effect for the third-party provider. If no record of such an agreement is found, or if a contract is found to be expired, in some implementations a response indicating that a currently valid business agreement is a prerequisite may be sent to the third-party resource provider 166. If a valid business agreement is in effect, the resource manager 180 may check that the information provided in the resell request is in accordance with the terms and conditions of the business agreement—e.g., some business agreements may limit the kinds of pricing policies that may be used, and the resource manager 180 may verify that the resell request does not violate any business restrictions.

The resource manager 180 may then check whether the system specifications of the third-party resource, which may be included in the resell request or may be pointed to from the resell request, are in accordance with the set of platforms supported for resale by the resource manager. For example, in one embodiment, the resource manager may wish to resell only those virtual compute resources that use a certain set of hardware vendors, or a certain set of hypervisors, and the resell request may be rejected if the third-party resource 160 uses some other hardware vendor or hypervisor.

In some embodiments, prior to making a decision to resell, the resource manager 180 may initiate or run one or more tests on the third-party resource 160, as indicated by the arrow labeled Execute_Validation_Tests 305 in FIG. 3. The tests may vary depending on the nature of the third-party resource and the expected client workload. For example, in some implementations, the resource manager may run some performance validation tests to check whether the third-party resource 160 meets desired performance requirements. The performance requirements may be based on the system specification 212 included in the resell request (e.g., the tests may verify that the third-party resource actually conforms to the provided specification), on a separate set of performance acceptance criteria enforced by the resource manager, or on both the system specification and enforced performance acceptance criteria. Other system validation tests, such as memory size verification tests, software version and update checks, may also be run in some embodiments. In one embodiment security checks, e.g., tests to determine whether the third-party system is vulnerable to some set of intrusions or attacks may also be conducted. The resource manager 180 may receive the results of the tests, as indicated by the arrow labeled Receive_Test_Results 310 in FIG. 3. If the results are acceptable, a resell acceptance notification 315 may be transmitted to the third-party resource provider 166; if the results are not acceptable, a rejection notification may be sent instead.

The resource manager 180 in some embodiments may run a suite of tests, including for example performance-related tests, security-related tests and so on, from whose results one or more scores (e.g., a performance score, a security score, and so on) may be assigned to the third-party resource in units that are vendor-agnostic. Such vendor-agnostic tests may enable the resource manager 180 to provide comparable performance ratings for several different third-party providers' resources, which may be displayed via the reservation interface if the resell request is accepted. In some cases an industry-standard benchmark or benchmarks may be used, similar in principle to the various suites of tests available from the System Performance Evaluation Corporation (SPEC). In some environments, the resource manager 180 may run a set of tests to determine availability-related characteristics of the third-party resource, e.g., long-duration stress tests, tests in which errors are deliberately injected in the third-party resource, or other similar tests.

After a resell request is accepted based on the combination of acceptance criteria being used, and the third-party resource provider 166 has been notified of the acceptance, the resource manager 180 may include the third-party resource 160 in its catalog of available resources. Potential clients 148 may use the reservation interface in some embodiments to search for resources by provider in some embodiments, or on the basis of desired specifications of performance, availability, installed software stack, or other resource characteristics. In some embodiments, where for example the resources 130 of the primary network are classified into performance-based categories (e.g., small vs. medium vs. large compute servers), the resource manager 180 may place a third-party resource into one of the categories, based on the system specifications of the third-party resource 160, and/or on the results of the kinds of tests discussed above. Using the same categories for classifying third-party resources 160 as are used for the primary network resources 130, even if the third-party resources 160 do not use the same hardware or software as the primary network resources 130, may make it easier for clients to select resources appropriate for their needs. In some embodiments, the types of tests mentioned above (e.g., performance tests, availability tests, security tests and the like) may be scheduled on the third-party resources by the resource manager 180 even after the initial decision to approve a resell request. For example, in one implementation the resource manager 180 may periodically schedule any desired combination of tests, to ensure that the third-party resources continue to meet their advertised capabilities over time, in accordance with a set of service quality maintenance criteria. Third-party providers whose resources fail to meet the desired service quality maintenance criteria of performance, availability, security and/or other characteristics may be advised of the problems encountered. In some embodiments the resource manager 180 may take some corrective actions in response to such problems or failures: e.g., the problematic resources may be ranked lower in an internal ranking used by the resource manager 180 to decide the order in which resources are listed in response to a client request. In some cases resources that fail to meet the desired standards may be removed from the catalog entirely (i.e., such third-party resources may no longer be resold using the resource manager's reservations interface). In this way, the resource manager 180 may be able to ensure that third-party resource providers continue to meet the high standards demanded by and promised to clients, over the long term.

Reservations and Control Operations for Third-Party Resources

Figure 4:
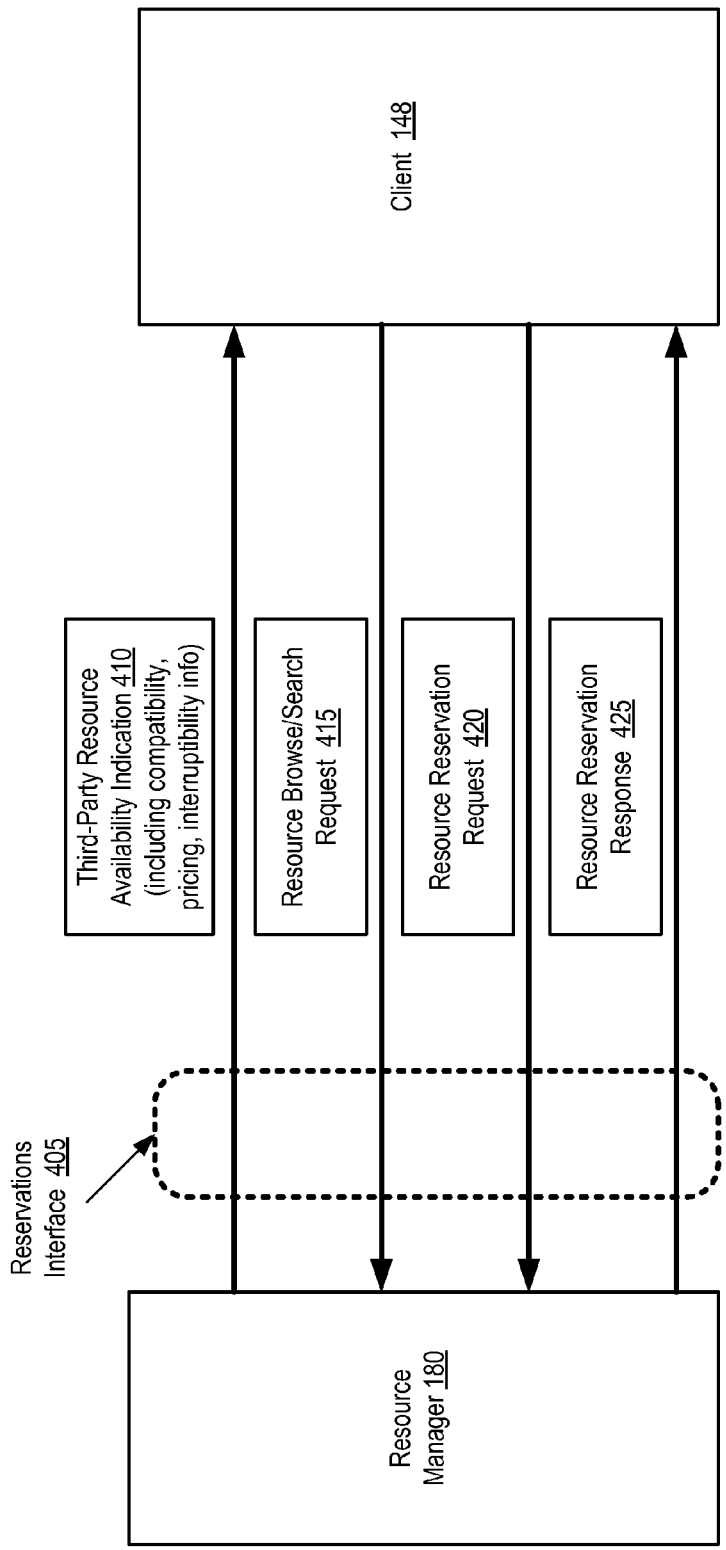
FIG. 4 illustrates examples of resource reservation-related interactions between a client and a resource manager, according to some embodiments.

FIG. 4 illustrates examples of resource reservation-related interactions between a client 148 and a resource manager 180, according to some embodiments. After a resell request for a third-party resource 160 is accepted, the resource manager 180 may provide an indication 410 to clients 148. e.g., via reservation interface 405, of the fact that the third-party resource is now available for reservations. The indication may, for example, comprise an inclusion of the third-party resource 160 in a listing of available resources, or may be provided via an item in a "latest news" section of a reservation-related web page. In some embodiments where, for example, potential clients 148 are willing to accept notifications regarding available resources, a message regarding newly available resources may be sent to potential clients. In one embodiment, clients 148 may discover that the third-party resource is available for reservation in response to queries or searches that the clients initiate (e.g., via a browse/search request 415). In some embodiments, the indication 410 may include various details about the third-party resource, such as a pricing policy, an interruptibility setting, and/or a level of compatibility of the third-party resource with a control interface usable to perform various operations on the resources 130 of primary network 110. In one implementation where the provider network 110 is organized as a set of availability zones 120, a collection 150 of third-party resources may be packaged or advertised as an additional availability zone, or as a special type of availability zone, so that clients already familiar with the concept of availability zones may be more likely to utilize the third-party resources.

Based on their needs, a client 148 may decide to reserve, purchase access to, or bid for, any of the types of resources for which information is provided via reservation interface 405. For example, the client may then transmit a resource reservation request 420 for a third-party resource 160 to the resource manager 180, identifying the characteristics of resource desired, the price the client is willing to bid (e.g., for third-party resources that support spot-pricing or auctioning) or pay (e.g., for fixed-price or immediate pricing modes), and other information that may be needed to allocate a resource of the requested type to the client. Using the information included in the reservation request 420, as well its knowledge of the goals and/or optimization preferences of the third-party resource provider 166, the resource manager 180 may find a third-party resource 160 that is a good fit for both the client's request and the third-party provider's goals. A resource reservation response 425 may be sent to the requesting client 148 in some embodiments, identifying the selected third-party resource 160 and providing any instructions or information needed by the client to access the resource (e.g., an IP address of the resource 160). In some embodiments the resource manager 180 may also be responsible for eventually determining the billing amounts that the client 148 is to pay (e.g., based on the duration for which the resource is reserved and/or actually used) and providing the billing amounts to the client. If the resource reservation request 420 included a bid or a maximum price the client 148 was willing to pay, and the bid or price was not sufficient to acquire a resource of the desired type, the reservation response 425 may indicate that the client's reservation request was rejected.

Figure 5:
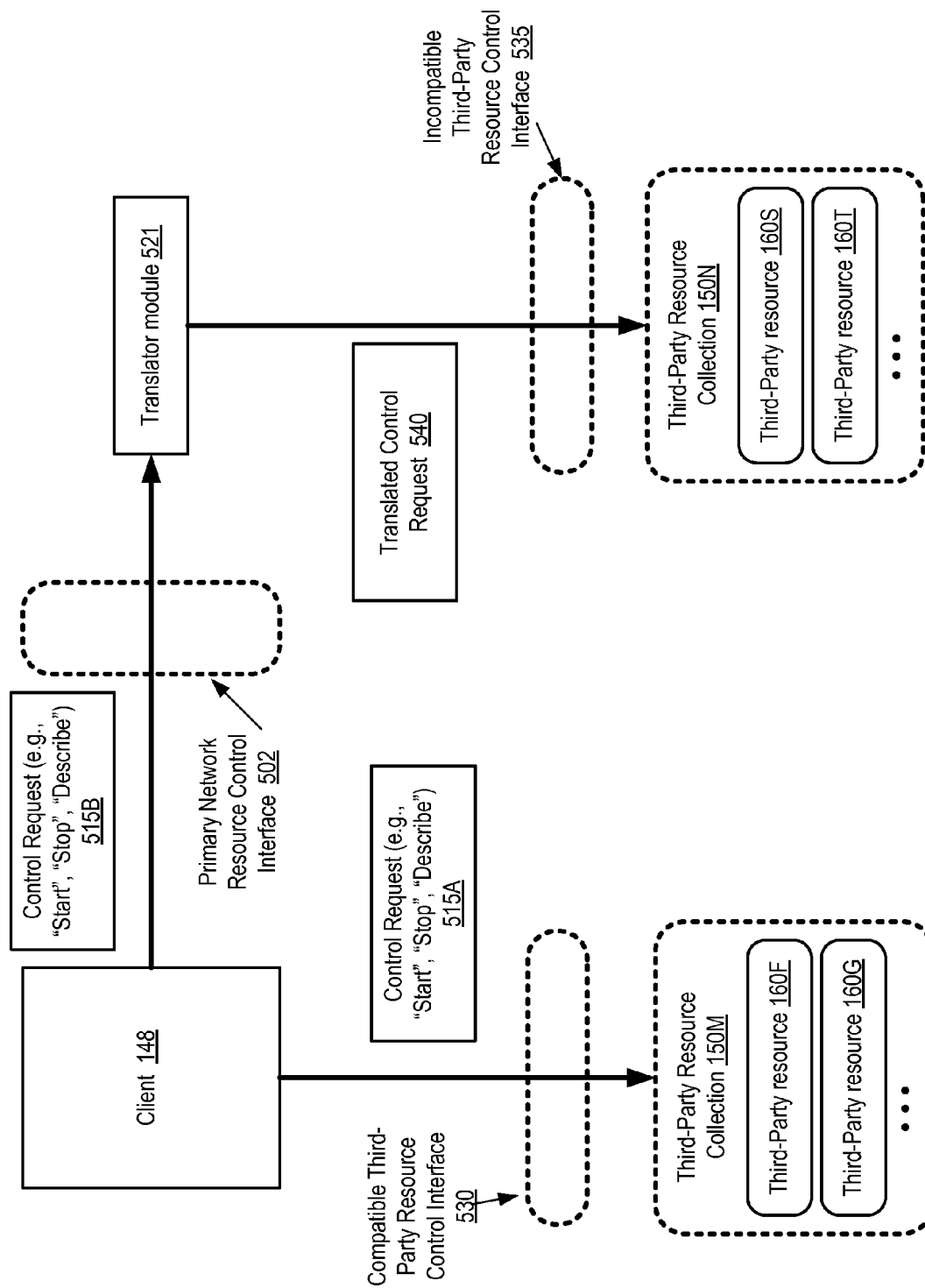
FIG. 5 illustrates examples of the flow of control requests from clients to third-party resources, according to some embodiments.

FIG. 5 illustrates examples of the flow of control requests from clients 148 to third-party resources 160, according to some embodiments. Using the access information provided in resource reservation response 425, a client 148 that successfully reserved or purchased access to a third-party resource 160 may begin to perform desired operations on the third-party resource. For example, in the case of a compute third-party resource instance, the client 148 may wish to start or stop the instance. To perform such operations, the client may use a control interface (e.g., a set of supported commands or APIs for the desired set of operations) in some embodiments. In FIG. 5, two examples of third-party resource collections 150 are shown—collection 150M, which supports a control interface 530 that is compatible with the control interface 502 supported for resources 130 of the primary network 110, and collection 150N, which supports a different control interface 535 that is incompatible with the primary network's control interface 502.

A compatible interface may support most, or all, of the operations supported by control interface 502 of the primary network 110, such that no changes (or at most minimal changes) may be required to the resource control and administration scripts or tools of a client 148 that was previously using control interface 502. For third-party resources such as 160F and 160G supporting a highly-compatible interface 530, the client 148 may directly send resource control requests 515A that may be formatted in accordance with interface 502. In the illustrated example collection 150M, the third-party resources 160F and 160G may be capable of interpreting such resource control requests 515A, as desired by the submitting client 148, and implementing the desired operations.

However, third-party resource 160S or 160T in collection 150N may not be capable of interpreting control requests formatted in accordance with primary network resource control interface 502. Instead, control requests from client 148A that are formatted in accordance with the primary network resource control interface 502 may need to be translated or transformed into an idiom, language, or set of commands that is understood by the third-party resources 160S and 160T. In the illustrated embodiment, a translator module 521 may be used to transform a control request 515B formatted in accordance with primary control interface 502 into a translated control request 540 that is compatible with third-party resource collection 150N's control interface 535. The translated resource control request 540, derived at least in part from the contents of the original control request 515B, may be transmitted to the targeted third-party resource 160S or 160T via the interface 535, as shown. Responses from third-party-resources 160S or 160T, if any, to the translated control request 540 may also be translated by the translator module 521 in some embodiments and then sent on to the client 148. The translator module 521 may be incorporated within resource manager 180 in some embodiments. In another embodiment, the translator module 521 may be installable at client devices, e.g., a software agent comprising the translator module 521 may be provided to clients 148 for installation on devices within their client networks. A translator module 521 may be instantiated on an intermediary network device (such as a gateway or proxy) through which requests are transmitted from client devices to third-party resource collections in some embodiments.

In some embodiments, a control interface supported at a third-party resource collection 150 may be partly compatible with a primary network's control interface 502, i.e., some operations of the primary control interface 502 may be supported, while others may not. Depending on the effort and cost involved, a client 148 may translate control requests itself, instead of relying on a translator module 521 to translate control requests as shown in FIG. 5.

Methods and Web Interfaces for Third-Party Resell Requests

Figure 6:
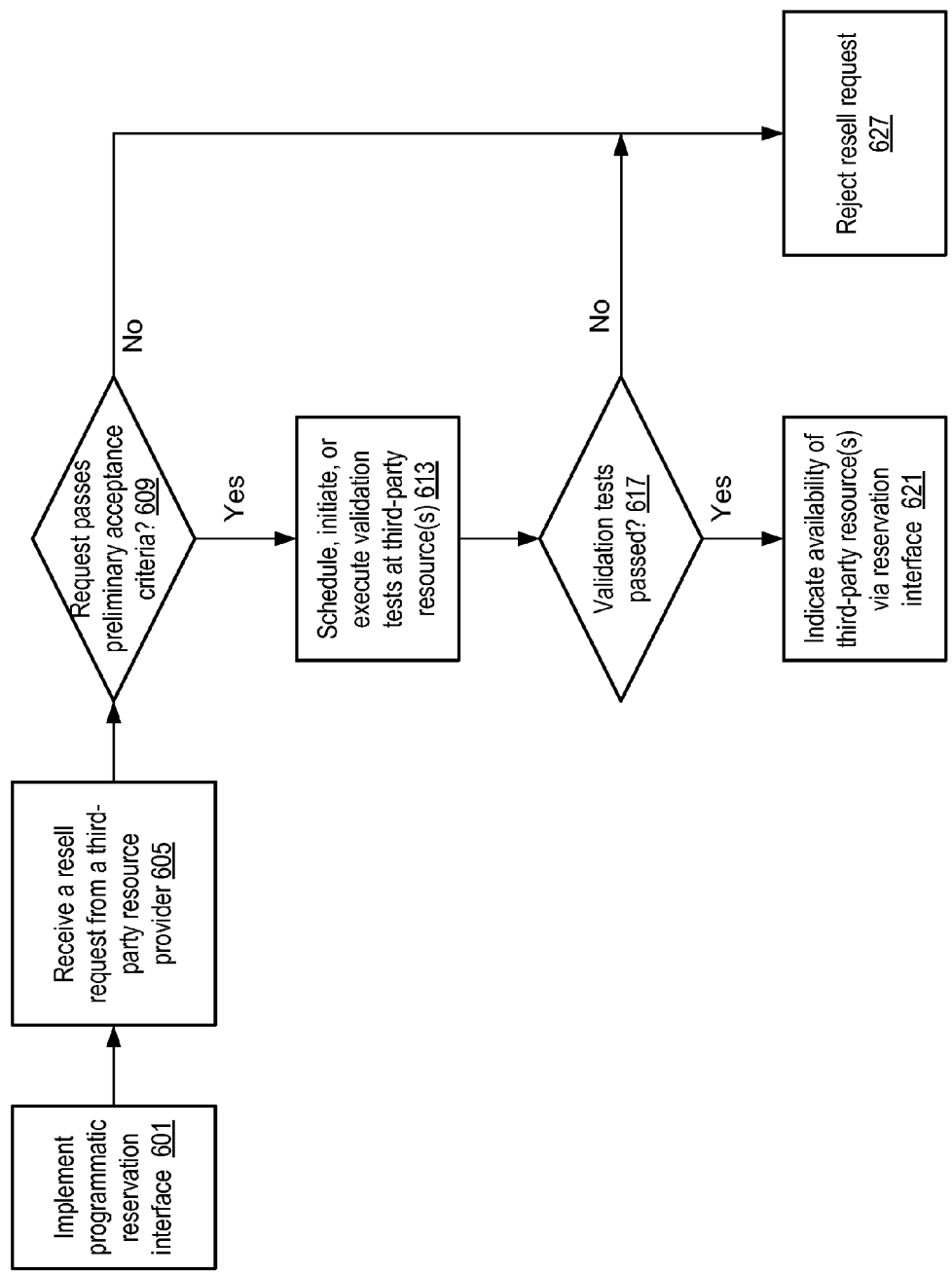
FIG. 6 is a flowchart of a method for processing requests to resell third-party resources, according to at least some embodiments.

FIG. 6 is a flowchart of a method for processing requests to resell third-party resources, according to at least some embodiments. A resource manager 180 may implement one or more programmatic interfaces to support the resale of third-party resources, as shown in element 601 of FIG. 6. In some embodiments a separate third-party reselling interface may also be implemented, e.g., to allow third-party resource providers 166 to transmit resell requests to a resource manager. The interface or interfaces may comprise, for example, a web-based interface such as one or more web pages or forms of a web site, an API, a command-interface, a standalone program such as a thick client program, or any combination of such interfaces. Examples of web pages that may be used for submitting resell requests are shown in FIGS. 7 and 8 for some embodiments.

When a resell request is received (as indicated in element 605 of FIG. 6), a set of preliminary acceptance criteria may be used to determine whether to continue processing the request. Such preliminary criteria may include determining whether the sender of the resell request has a currently-valid business agreement or contract, whether the sender belongs to an accepted list of resellers, whether the claimed hardware/software specifications of the third-party resource are good enough to qualify the resource as being re-sellable, and so on. If the resell request passes the preliminary acceptance criteria (as determined in element 609 of FIG. 6), in some embodiments the resource manager 180 may schedule, initiate, and/or execute a set of validation tests at the third-party resource, as indicated in element 613. Tests of various types may be run in different embodiments, such as performance tests for CPUs, memory and/or I.O, software version/patch verification tests, availability-related tests, and so on, as described in conjunction with the description of FIG. 3 above. If the validation tests succeed, as determined in element 617 of FIG. 6, the resell request may be accepted. That is, the third-party resource may be included in the set of resources available for reservation or purchase via the reservation interface, and one or more indications that the third-party resource is available may be provided via the reservation interface (element 621). The indications may comprise any combination of several types of information regarding the third-party resource being resold, such as pricing models, interruptibility settings, and the level of compatibility of a control interface usable for the third-party resource with a control interface usable for other resources accessible via the reservation interface. If either the preliminary acceptance criteria are not met, or the validation tests fail, the resell request may be rejected, as indicated in element 627.

In one embodiment, the resource manager may implement one or more marketplaces for the resources 130 of a primary network 110, and the third-party resource may be sold via one of those marketplaces, or an extension thereof. For example, the resource manager 180 may have set up one market for spot-priced resource instances of the primary network 110, and if the third-party resource provider is willing to use spot-pricing for the resource it wishes to resell, the third-party resource may be included within an expanded spot market that now supports multiple resource providers. Similarly, if the third-party resource provider wishes to use fixed-pricing or long-term reservations, the resource manager may simply extend the corresponding existing marketplace for those types of resources, allowing a provider to be specified for each resource or each set of resources, and may include the third-party provider's resources in the extended marketplace. In one implementation where for example the resources 130 of a primary network 110 are arranged in availability zones, the third-party resources made available at a particular data center of the third-party resource provider may be treated as though they are simply all part of another availability zone. As noted earlier, in some embodiments the resource manager 180 may schedule, initiate or execute various types of tests on third-party resources after the initial resell decision has been made, e.g., to ensure that the third-party resources continue to provide the desired levels of performance, availability, security and the like for as long as they continue to be resold.

As noted above, in some embodiments, web-based interfaces may be used for submitting resell requests. FIGS. 7 and 8 illustrate portions of an example web-based interface that may be used by a third-party resource provider for requests to resell resources, according to some embodiments. FIG. 7 represents a first page 700 of a set of web pages that may be used to provide information on one or more third-party resources 160. As shown, page 700 may include a welcome message 703 and various form elements in the illustrated embodiment. For example, form field 705 may be used to provide details about the third-party resource provider 166, such as a name and contact information. Form field 707 may be used to provide information about data centers where the resources are located.

In the illustrated embodiment, the third-party resource provider 166 is allowed to group resources into sets; for example, one set may comprise multiple virtual computers each having one type of processor, another set may comprise multiple virtual computers each having another type of processor, and so on. Section 709 of web page 700 may allow the client to provide details for a given resource set, such as the resource type (e.g., compute vs. storage vs, bandwidth), the number of resources in the set, the hardware vendor and model, the software/firmware installed, one or more performance specifications, and coordinates (such as IP addresses and/or credentials) that may be used to access the resources. Similar information for additional resource sets may be provided in some implementations, e.g., by clicking on the button marked "Click to enter information for more resource sets". The third-party resource provider 166 may proceed to the next web page by clicking on the "Next" button in the illustrated embodiment.

As a result of clicking on the "Next" button 715, the third-party resource provider may reach a second page 800 of the web-based reselling interface, shown in FIG. 8 for one embodiment. A section 805 of the page 800 may be used by the third-party resource provider 166 for information on the level of compatibility of the third-party resources with a control interface supported within the primary network 110. In the illustrated example, the primary network supports control operations in accordance with a specification (the "ZZZZ" specification), such as an industry-standard specification for control operations on cloud-based resources, or a vendor-developed specification. Four example compatibility-related options that the third-party resource provider 166 may choose from are shown in FIG. 8. The first two options may be used to indicate that the ZZZZ specification is fully supported by the third-party resources, or partly supported, respectively. A third option may indicate that the third-party resources support a different specification. The fourth option may allow the third-party resource provider 166 to indicate that its resources are available simply as "bare-metal" devices with minimal support for advanced control operations—e.g., implying that the resource manager 180 or a client that reserves the resources may be responsible for installing much of the software stack. Other options for indicating compatibility levels may be provided in some implementations, including, for example, an interface to provide details of how various types of control operations should be performed.

Section 810 of web page 800 may be used to specify pricing-related information about the third-party resources being resold, such as whether dynamic spot-pricing is to be used, auctions are to be used, an immediate-pricing model is to be used, or fixed prices (such as long-term reservations based fixed prices, or on-demand fixed prices) are to be used. In some cases, multiple pricing options that the third-party resource provider is willing to accept may be selectable via the web interface. Additional details, such as the minimum price acceptable, or the immediate price, may be provided via other portions of the web-based interface. The third-party resource provider may also specify interruptibility settings for the third-party resources using section 815 of web page 800. Possible choices for desired interruptibility settings may include "don't care", price-based-interrupts, a fulfillment-based-interrupts setting, and a non-interruptible setting. By choosing the "don't care" option, the third-party resource provider may indicate to the resource manager 180 that the resource manager is free to choose any type of interruptibility setting for the third-party resource. The fulfillment-based interrupts setting may allow the third-party resource provider to revoke, withdraw, or cancel an ongoing reservation or allocation if the third-party resource provider receives a request from one of its own customers requesting a provisioning of a resource for which the third-party resource provider had earlier made a commitment (e.g., if the customer wants to instantiate a resource instance for which a reservation had been made previously). Such a fulfillment-based interrupts policy may allow the third-party resource provider to resell excess capacity while at the same time retain the right to meet unexpected peaks in demand from its own customers. Additional interruptibility setting choices may be provided in some implementations. In some embodiments, pricing and interruptibility options may be linked, or a single set of options combining pricing and associated interruptibility may be offered instead of two separate sections 810 and 815. For example, a reservation that was interruptible may cost less than a reservation that does not allow interruptions.

A section 820 of the web page 800 may allow the third-party resource provider 166 to indicate whether the third-party resource reservations should be scheduled with the help of an optimization engine (which may be incorporated as a component of resource manager 180 in some embodiments). If the third-party resource provider selects the "No, don't bother" option, the resource manager may not expend any effort on optimization and may for example, simply add a resource pool containing the third-party resources to the set of resource pools being managed. If the third-party resource provider 166 wishes to use an optimization engine, the goals of the optimization (e.g., maximize revenue, or maximize long-term utilization) may be specifiable via section 820. The "Next" button 825 may be used to proceed to additional pages of the web-based interface in some embodiments.

Methods and Interfaces for Reserving and Scheduling Third-Party Resources

Figure 9:
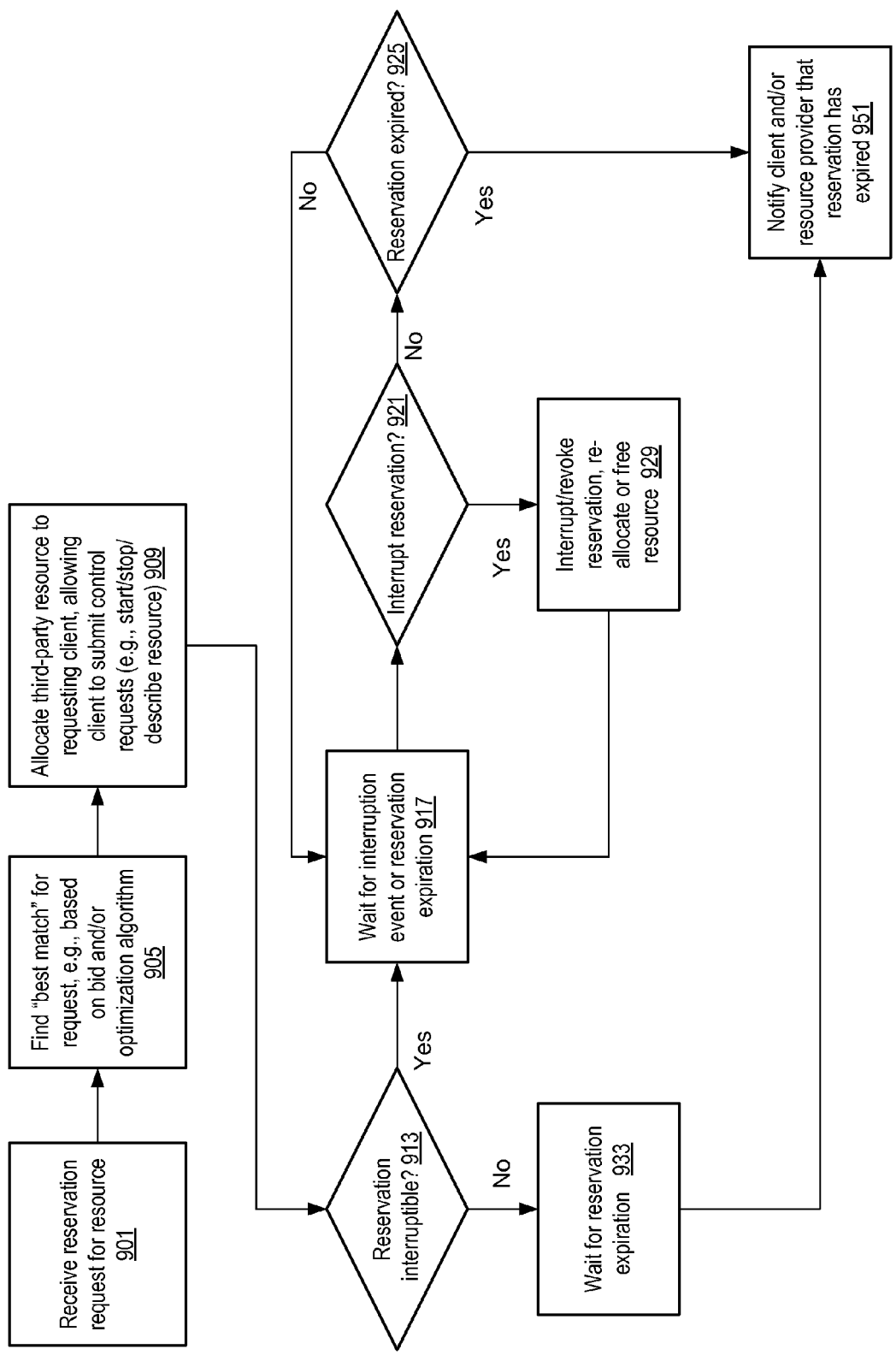
FIG. 9 is a flowchart of a method for processing reservation requests for, and scheduling access to, third-party resources, according to at least some embodiments.

FIG. 9 is a flowchart of a method for processing reservation requests for, and scheduling access to, third-party resources, according to at least some embodiments. A reservation request specifying one or more criteria for a desired resource may be received from a client, as shown in element 901 of FIG. 9. The criteria may for example indicate the type of resource (e.g., large vs. medium vs. small compute resource), preferred vendors, preferred pricing information such as a maximum acceptable price, preferred location, and so on. Based on the criteria specified in the request, and on any optimization goals that may be relevant (such as "maximize-revenue" or "maximize-long-term-utilization") for the third-party resource provider 166 or for the operator of the primary network 110, the resource manager may find the best available match for the resource request (element 905 of FIG. 9). When finding a best match for the request, the resource manager 180 may in some embodiments take into account the current operational state of one or more resource pools of the primary network 110, e.g., it may try to compensate for peak utilization periods in the primary network by prioritizing usage of idle third-party resources.

The resource that best matches the criteria being used by the resource manager 180 may then be allocated or reserved for the requesting client (element 909 of FIG. 9). The best match may be a third-party resource 160, or a primary network resource 130, depending on client-specified criteria and the results of the search or optimization algorithm used by the resource manager. The client may then be provided with access details (e.g., IP address and login credentials) to start using the resource, e.g., to issue control commands or operations such as "start instance" "stop instance" and the like. The duration for which the client retains access to the resource may depend on the interruptibility setting chosen for the resource reservation. If the reservation is not interruptible, as determined in element 913 of FIG. 9, the client may retain the rights to access the resource for an agreed-upon duration, and the resource manager 180 may wait for the expiration of the reservation (element 933). Upon the expiration of the reservation, the client and/or the resource provider may be informed that the reservation has expired (element 951). In many embodiments the client may also be informed prior to the expiration that the reservation is expiring soon.

If the reservation is interruptible, as shown in element 917, the resource manager 180 may wait for one of two types of events: (a) an interruption event, such as the arrival of a reservation request with a higher bid for the same type of resource, or (b) the expiration of the reservation, assuming that the reservation specified an end time. If the resource manager determines that the reservation is to be interrupted (as determined in element 921), the reservation may be revoked or canceled, and the resource may be reallocated or freed, depending on the kind of interrupt event that transpired (element 929). For example, if a higher bid was received for an interruptible reservation, the resource may be allocated to the client that submitted the higher bid. In some cases the interruptibility settings for a resource may allow the third-party resource provider 166 to revoke or cancel reservations (e.g., based on a spike in demand from the third-party resource provider's own customers or users). In such a case, the interruption event may be a request from the third-party resource provider to free the third-party resource, i.e., to return control of the resource to the third-party resource provider. If the reservation expires for the interruptible resource (as determined in element 925), without any prior interruption event, the client and/or the resource provider may be informed about the expiration.

Clients 148 may be provided with a programmatic interface, such as a web-based interface, a command-line interface, or an API, to specify the criteria to be used to find an appropriate resource in some embodiments. An example of a web page 1000 that may be used for a reservation request is shown in FIG. 10. The web page 1000 may include a welcome message area 1003, and one or more form areas 1007. The client may specify the desired resource type (e.g., compute vs. storage vs. bandwidth) and resource size (e.g., small vs. medium vs. large) via respective form fields in some implementations. Some of the remaining form fields shown on a reservations request web page may vary based on the type of resource requested—in the illustrated example, for example, the fields most relevant to compute resources are shown. The maximum price the client is willing to pay may also be specified via the web interface as shown. Some of the form fields, such as the resource type field, the resource size field, and the price field, may be required, while the client may have the option of leaving other fields blank. Default values may be supplied for some or all of the form fields. An interface control such as the button labeled "Click to see pricing history" may be provided to allow the client to view the pricing history of resources of the specified type and size (or of any desired type/size combination).

Using form area 1007 or its equivalent, clients may specify other desired or acceptable characteristics of the resource. For example, clients may be allowed to restrict the set of resource vendors or providers, or indicate a set of preferred vendors. In some implementations clients may use the web interface to indicate preferences or relative rankings for pricing models (e.g., whether they would prefer to pay for resource usage using spot-pricing vs. auctions vs. fixed pricing). The kinds of interruptibility settings that are acceptable for their resource reservations may also be indicated—for example, some clients may wish to reserve resources only in do-not-interrupt mode, while others may be willing to accept some probability of interruption as a tradeoff for a lower price.

As noted above, a client may be able to use their resource control scripts (e.g., scripts to start/stop/inspect resources) and/or tools for third-party resources without substantial porting or modifications, if the third-party resource supports the control interface that is currently being used by the client. In some embodiments the web interface may allow clients to specify a desired compatibility level for the resource control interface, as indicated in FIG. 10 by the "Preferred interface compatibility level" form field. The time period for which the resource is needed by the client may be specified by another form field. In some implementations the client may also provide information on preferred data center locations (i.e., one client whose own premises and/or networks are in the U.S. east coast may prefer to use resources that are nearby for performance reasons, while another client from the U.S. east coast may prefer to use resources in a different geographical region for availability reasons). Clients may indicate that they prefer to use resource providers with a specified minimum satisfaction rating using another form field, as shown. Drop-down controls may allow the client to select from among a set of choices for various form fields in some implementations. Various other desired or acceptable characteristics may be specified using the interface in different embodiments.

Based upon the resource characteristics supplied in the reservation request, the resource manager 180 may attempt to find a suitable resource for the requesting client 148, as indicated in element 905 of FIG. 9. The resource manager 180 may also take the goals of the various third-party providers 166, as well as the goals of the operator of the primary network 110, into account in finding the best match for the resource request. Using these criteria, an optimization engine of the resource manager 180 may identify one or more resources (from any combination of third-party resource providers and/or the primary network) that are deemed most likely to be acceptable to the client in some embodiments. Information on the candidate resources may also be displayed to the requesting client 148 via a web-based interface. An example web page 1100 of such an interface is shown in FIG. 11, according to one embodiment. Web page 1100 may be displayed, for example, in response to the client's submission of reservation form details using the "Show me my choices" button 1015 of FIG. 10.

Web page 1100 with candidate resources found for the client may in some embodiments rank the candidates based on some default criterion such as price, as indicated in area 1103. The client may be allowed to change the ranking criteria, e.g., using drop-down fields labeled "Ranking criterion #1" and "Ranking criterion #2" in the example shown in FIG. 11. In some embodiments, the resource manager 180 may use the results of various tests and/or measurements to rank various third-party providers, e.g., instead of or in addition to allowing the client to specify ranking criteria. For example, in one embodiment, the resource manager may use metrics such as the measured up-time of compute instances of the third-party providers for ranking (those vendors whose resources tend to remain up longer may be ranked higher in such a case), or metrics based on results of various combinations of performance, availability, and security tests that the resource manager 180 may schedule from time to time on the third-party resources to ensure that service quality is maintained. A set of properties 1107 (e.g., 1107A, 1107B) of each candidate resource may be displayed in web page 1100. The properties indicated for each candidate resource may include, for example, the vendor or provider name and a current price for the resource (with a validity period for the price specified in some implementations). Additional information about the resource provider, such as a "satisfaction rating over the last six months", and/or an indication of how many reservations of similar resources were made using the provider, and how many resources of the desired type are currently available from the provider, may also be shown in a property set 1107 in some implementations. Further information, e.g., on pricing modes supported, interruptibility settings supported, and control interface compatibility, may also be provided in the illustrated embodiment. An interface control such as the button labeled "I need more info . . . " shown in property set 1107A may allow the client to obtain additional details about the candidate resource(s). If the client wishes to reserve one of the displayed candidates, or place a bid for one of the displayed candidates, a control such as the button labeled "Reserve . . . " may be used.

Figure 12:
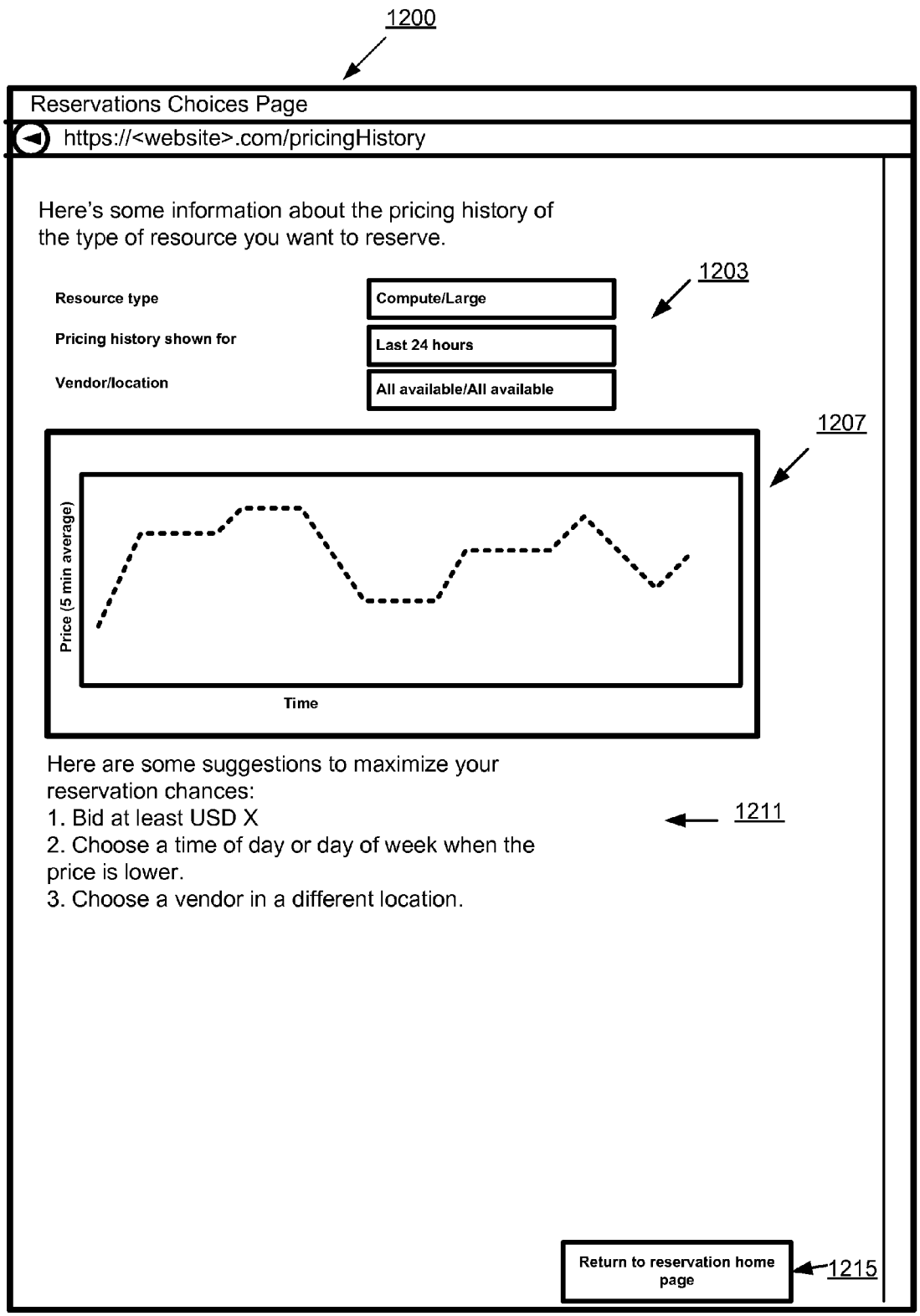
FIG. 12 illustrates a portion of an example web-based interface that may be used to provide resource pricing history, according to some embodiments.

If a client 148 clicks on the "click to see pricing history" button shown in FIG. 10, the client may be led to a graphical display of pricing information in some embodiments. FIG. 12 shows an example of a web page that may be used for pricing information in some embodiments. Such a pricing history page may include a section 1203 listing some characteristics of the resources for which pricing history is being displayed, such as the resource type, the provider and/or location, and the time period for which the pricing history is displayed. In some embodiments a client may be permitted to make changes to these characteristics (e.g., via drop-down buttons), allowing the client to view pricing history for different types of resources over different periods of time. The fluctuations in price over the selected time period may be shown via a graph area 1207, which may be dynamically updated in some implementations. In one implementations, some suggestions or guidance on how to increase the chances of making a successful bid or reservation may also be provided via the web interface, e.g., via a section similar to section 1211. The client may use a button 1215 to return to the reservations home page in some embodiments.

Example Use Cases

The techniques described above for enabling third-party resource reselling may be useful in a wide variety of environments. As the size and complexity of cloud-based resource provisioning grows, and more and more applications are deployed into cloud environments, the probability that resources of a particular type or in a particular data center remain underutilized, while at the same time demand for that same type of resource somewhere else is high, will tend to grow. The ability of a resource manager to match peaks in demand with resources from any available provider will be useful in maintaining high customer satisfaction, and will also help third-party providers to maximize their own return on investment.

Expanding an established resource marketplace to include third-party resources may also have other benefits, beyond the enhanced ability to respond to demand peaks. For example, clients may like the ability to select from a wider variety of resource types; some third-party vendors may make resell resources that are highly specialized for certain types of high-performance or high-availability applications, which may not typically be easy to find in cloud-based infrastructure environments. The likelihood of cascading failures affecting the entire set of resources being used by a client may also decline if multiple providers are used. Some clients may also wish to ensure that they are not tied in to a single vendor, and may welcome the expansion of a resource marketplace to support multiple providers. In environments where different providers support different control interfaces, a translation mechanism (similar to the translation 521 shown in FIG. 5) that makes it easy to reuse the same tools or scripts for resource control operations may also be very beneficial to clients.

Illustrative Computing Device

Figure 13:
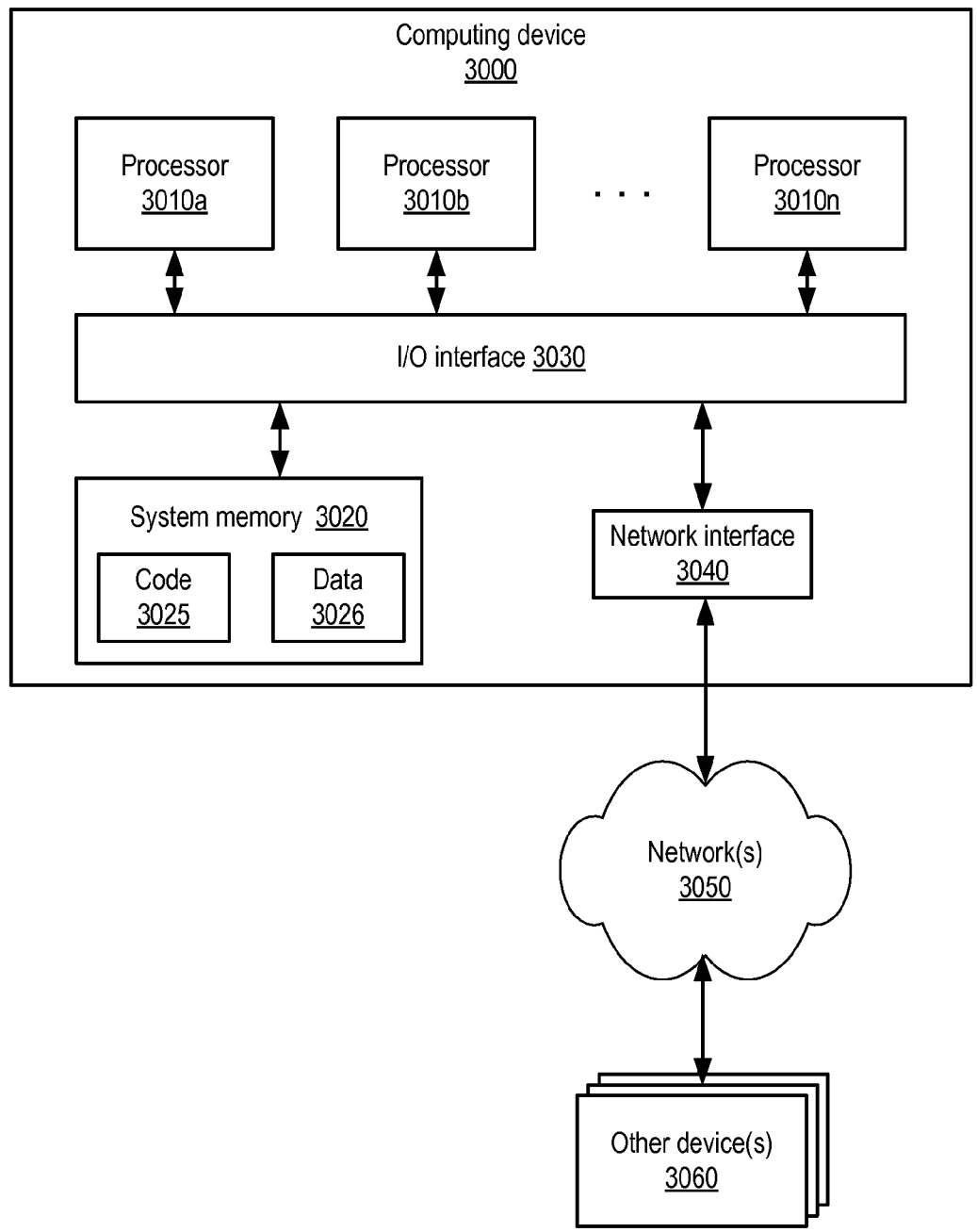
FIG. 13 is a block diagram illustrating an example computing device that may be used in some embodiments.

In at least some embodiments, a server that implements a portion or all of one or more of the technologies described herein, including the techniques to support reservations and reselling of third-party resources 160, may include a general-purpose computer system that includes or is configured to access one or more computer-accessible media. FIG. 13 illustrates such a general purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 12, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 12 for implementing embodiments of methods and apparatus for supporting reservation and resale of third-party resources. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  a plurality of computing devices configured to implement a plurality of resources of a primary network; and
  one or more computing devices configured to implement a resource manager;
  wherein the resource manager is configured to:
    implement a reservation interface allowing a client to select and reserve a resource of the plurality of resources of the primary network;
    in response to receiving, from a third-party resource provider, a request to provide a third-party resource via the reservation interface:
      determine whether the request satisfies one or more preliminary criteria, wherein the request includes information indicating a system specification of the third-party resource, and wherein the one or more preliminary criteria comprise determining whether the indicated system specification is in accordance with a set of supported platforms;
      in response to a determination that the request satisfies the one or more preliminary criteria, initiate execution of one or more computer-executable tests of the third-party resource, wherein the one or more computer-executable tests are executed at a computing resource of the third-party resource;
      determine whether test results from the one or more computer-executable tests at the computing resource of the third-party resource satisfy one or more acceptance criteria, wherein the one or more acceptance criteria include whether a tested system specification of the third-party resource conforms to the indicated system specification, and wherein the test results include information corresponding to the tested system specification;
      based at least in part on the test results satisfying the one or more acceptance criteria, indicate, via the reservation interface, a pricing policy associated with the third-party resource, an interruptibility setting of the third-party resource, and a level of compatibility of the third-party resource with a control interface implemented to allow clients to perform operations on resources of the primary network; and
      based at least in part on the test results not satisfying the one or more preliminary criteria or the one or more acceptance criteria, reject the request.

2. The system as recited in claim 1, wherein the provided system specification comprises one or more of: specifications for hardware and software configurations, or performance specifications, and wherein to determine whether the tested system specification of the third-party resource conforms to a provided system specification, the resource manager is further configured to compare the provided system specification to the tested specification included in the test results.

3. The system as recited in claim 1, wherein the interruptibility setting comprises one or more of: a price-based-interrupts setting indicating that an ongoing reservation is interruptible based at least in part on a pricing level associated with the ongoing reservation, a fulfillment-based-interrupts setting indicating that an ongoing reservation is interruptible in response to a fulfillment request for a pre-existing resource commitment of the third-party resource provider, or a do-not-interrupt setting indicating that an ongoing reservation is not interruptible.

4. The system as recited in claim 1, wherein the one or more preliminary criteria further comprises determining whether the third-party resource provider has a valid business agreement or contract, determining whether the third-party resource provider is included in an accepted list of resource providers, or both.

5. The system as recited in claim 1, wherein the level of compatibility comprises one of: a loosely-compatible level, in which at least one operation available to control resources of the primary network is not supported by the third-party resource; or a tightly-compatible level, in which each operation of a specified set of operations to control resources in the primary network is supported by the third-party resource.

6. The system as recited in claim 1, wherein the request comprises an indication of a desired optimization policy for scheduling operations on a plurality of third-party resources of the third-party resource provider, wherein the desired optimization policy comprises at least one of: a maximize-revenue policy, or a maximize-long-term-utilization policy.

7. A method, comprising:
implementing a programmatic reservation interface allowing a client of a primary provider network to reserve a resource of the primary provider network;
in response to receiving a request from a third-party resource provider to indicate an availability of a third-party resource via the reservation interface:
determining whether the request satisfies one or more preliminary criteria, wherein the request includes information indicating a system specification of the third-party resource, and wherein the one or more preliminary criteria comprise determining whether the indicated system specification is in accordance with a set of supported platforms;
in response to a determination that the request satisfies the one or more preliminary criteria, initiating execution of one or more computer-executable tests of the third-party resource, wherein the one or more computer-executable tests are executed at a computing resource of the third-party resource;
determining whether test results from the one or more computer-executable tests at the computing resource of the third-party resource satisfy one or more acceptance criteria, wherein the one or more acceptance criteria include whether a tested system specification of the third-party resource conforms to the indicated system specification, and wherein the test results include information corresponding to the tested system specification; and
based at least in part on the test results satisfying the one or more acceptance criteria, indicating, via the reservation interface, a level of compatibility of the third-party resource with a control interface implemented to allow clients to perform operations on resources of the primary network.

8. The method as recited in claim 7, wherein the test results comprise one or more performance scores resulting from execution of the one or more computer-executable tests, wherein the one or more performance scores are indicated via the reservation interface.

9. The method as recited in claim 7, further comprising:
based at least in part on the test results satisfying the one or more acceptance criteria, indicating, via the reservation interface, an interruptibility setting associated with an allocation of the third-party resource, wherein the interruptibility setting comprises one or more of: a price-based-interrupts setting indicating that the allocation is interruptible based at least in part on a pricing level associated with the ongoing reservation, a fulfillment-based-interrupts setting indicating that the allocation is interruptible in response to a fulfillment request for a pre-existing resource commitment of the third-party resource provider, or a do-not-interrupt setting indicating that the allocation is not interruptible.

10. The method as recited in claim 7, further comprising:
based at least in part on the test results satisfying the one or more acceptance criteria, indicating, via the reservation interface, a pricing policy associated with the third-party resource, wherein the pricing policy comprises one or more of: a dynamic-spot-pricing model, an auction model, an immediate-pricing model, a long-term reservation pricing model, or an on-demand pricing model.

11. The method as recited in claim 7, wherein the level of compatibility comprises one of: a loosely-compatible level, in which at least one operation available to control resources of the primary network is not supported by the third-party resource; or a tightly-compatible level, in which each operation of a specified set of operations to control resources in the primary network is supported by the third-party resource.

12. The method as recited in claim 7, wherein the request comprises an indication of a desired optimization policy for scheduling operations on a plurality of third-party resources of the third-party resource provider, wherein the desired optimization policy comprises at least one of: a maximize-revenue policy, or a maximize-long-term-utilization policy.

13. The method as recited in claim 7, further comprising:
receiving a first control request, formatted in accordance with the control interface, for a client operation to be performed at the third-party resource;
generating a second control request derived at least in part from the first control request, wherein the second control request is formatted in accordance with a third-party control interface available to perform operations on the third-party resource; and
forwarding the second control request to the third-party resource.

14. The method as recited in claim 7, further comprising:
receiving a reservation request from a client for the third-party resource via the reservation interface;
determining a reservation price to be paid by the client for reserving the third-party resource;
reserving the third-party resource in accordance with the reservation request; and
sending a notification comprising the reservation price to the third-party resource provider.

15. The method as recited in claim 7, further comprising:
obtaining a customer satisfaction indication associated with the third-party resource provider; and
providing the customer satisfaction indication via the reservation interface.

16. The method as recited in claim 7, further comprising:
implementing a programmatic third-party interface, wherein the request is formatted in accordance with the programmatic third-party interface.

17. The method as recited in claim 7, further comprising:
obtaining an indication of a monitoring interface supported by the third-party resource provider; and
collecting a metric of the third-party resource using the monitoring interface.

18. A non-transitory computer-accessible storage medium storing program instructions that, when executed on one or more processors, cause the one or more processors to:
implement a programmatic reservation interface allowing a client of a primary provider network to reserve a resource of the primary provider network;

in response to receiving a request from a third-party resource provider to indicate an availability of a third-party resource via the reservation interface:
  determine whether the request satisfies one or more preliminary criteria, wherein the request includes information indicating a system specification of the third-party resource, and wherein the one or more preliminary criteria comprise determining whether the indicated system specification is in accordance with a set of supported platforms;
  in response to a determination that the request satisfies the one or more preliminary criteria, initiate execution of one or more computer-executable tests of the third-party resource, wherein the one or more computer-executable tests are executed at a computing resource of the third-party resource;
  determine whether test results from the one or more tests at the computing resource of the third-party resource satisfy one or more acceptance criteria, wherein the one or more acceptance criteria include whether a tested system specification of the third-party resource conforms to the indicated system specification, and wherein the test results include information corresponding to the tested system specification; and
  based at least in part on the test results satisfying the one or more acceptance criteria, indicate, via the reservation interface, an interruptibility setting of the third-party resource.

19. The storage medium as recited in claim 18, wherein the one or more acceptance criteria comprise one or more of: specifications for hardware and software configurations, or performance specifications.

20. The storage medium as recited in claim 18, wherein the interruptibility setting comprises one or more of: a price-based-interrupts setting indicating that an allocation of the third-party resource is interruptible based at least in part on a pricing level associated with the ongoing reservation, a fulfillment-based-interrupts setting indicating that an allocation of the third-party resource is interruptible in response to a fulfillment request for a pre-existing resource commitment of the third-party resource provider, or a do-not-interrupt setting indicating that an allocation is not interruptible.

21. The storage medium as recited in claim 18, wherein the instructions when executed on the one or more processors further cause the one or more processors to:
  based at least in part on the test results satisfying the one or more acceptance criteria, indicate, via the reservation interface, a pricing policy of the third-party resource, wherein the pricing policy comprises one or more of: a dynamic-spot-pricing model, an auction model, an immediate pricing model, a long-term reservation pricing model, or an on-demand pricing model.

22. The storage medium as recited in claim 18, wherein the instructions when executed on the one or more processors further cause the one or more processors to:
  based at least in part on the test results satisfying the one or more acceptance criteria, indicate, via the reservation interface, a level of compatibility of the third-party resource with a control interface implemented to allow clients to perform operations on resources of the primary network, wherein the level of compatibility comprises one of: a loosely-compatible level, in which at least one operation available to control resources of the primary network is not supported by the third-party resource; or a tightly-compatible level, in which each operation of a specified set of operations to control resources in the primary network is supported by the third-party resource.

23. The storage medium as recited in claim 18, wherein the request comprises an indication of a desired optimization policy for scheduling operations on a plurality of third-party resources of the third-party resource provider, wherein the desired optimization policy comprises at least one of: a maximize-revenue policy, or a maximize-long-term-utilization policy.

24. The storage medium as recited in claim 18, wherein the third-party resource comprises at least one of: a compute resource, a storage resource, or network bandwidth.

25. The storage medium as recited in claim 18, wherein the instructions when executed on the one or more processors further cause the one or more processors to:
  schedule an execution of one or more quality tests of the third-party resource after determining that the test results satisfy the one or more acceptance criteria, in accordance with one or more service quality maintenance criteria; and
  based on the one or more quality tests indicating that the third-party resource does not satisfy the one or more service quality maintenance criteria:
    removing the indication of the third-party resource from the reservation interface; and
    sending an advisory message to the third-party resource provider indicating that the third-party resource has failed at least one of the one or more quality tests.

26. The storage medium as recited in claim 25, wherein the instructions when executed on the one or more processors further cause the one or more processors to:
  assign a ranking to the third-party resource within a ranked listing of a plurality of resources accessible by a client, based at least in part on a result of the execution of the one or more quality tests.

27. The storage medium as recited in claim 18, wherein the instructions when executed on the one or more processors further cause the one or more processors to:
  perform one or more billing operations associated with the third-party resource on behalf of the third-party provider.

* * * * *